US012633644B2

(12) United States Patent
Dai

(10) Patent No.: US 12,633,644 B2
(45) Date of Patent: May 19, 2026

(54) ANTENNA

(71) Applicant: Vitro Automotive Holdings Corporation, Cheswick, PA (US)

(72) Inventor: David Dai, Cheswick, PA (US)

(73) Assignee: Vitro Automotive Holdings Corporation, Cheswick, PA (US)

(*) Notice: Subject to any disclaimer, the term of this patent is extended or adjusted under 35 U.S.C. 154(b) by 104 days.

(21) Appl. No.: 18/798,509

(22) Filed: Aug. 8, 2024

(65) Prior Publication Data

US 2025/0055174 A1 Feb. 13, 2025

Related U.S. Application Data

(60) Provisional application No. 63/519,071, filed on Aug. 11, 2023.

(51) Int. Cl.
*H01Q 1/12* (2006.01)
*H01Q 13/10* (2006.01)

(52) U.S. Cl.
CPC ......... *H01Q 1/1271* (2013.01); *H01Q 13/106* (2013.01)

(58) Field of Classification Search
CPC .. H01Q 13/106; H01Q 1/1285; H01Q 1/1271; H01Q 1/28; H01Q 9/0428
See application file for complete search history.

(56) References Cited

U.S. PATENT DOCUMENTS

| | | | | |
|---|---|---|---|---|
| 5,355,144 A * | 10/1994 | Walton | H01Q 13/16 343/769 |
| 5,670,966 A * | 9/1997 | Dishart | H01Q 1/1271 343/906 |
| 10,490,877 B2 | 11/2019 | Talty et al. | |
| 10,665,919 B2 | 5/2020 | Droste et al. | |
| 10,737,469 B2 | 8/2020 | Droste et al. | |
| 2005/0195115 A1* | 9/2005 | Yegin | H01Q 9/0428 343/713 |
| 2017/0324141 A1* | 11/2017 | Talty | H01Q 1/3291 |
| 2019/0280365 A1 | 9/2019 | Song et al. | |
| 2019/0319333 A1* | 10/2019 | Dai | H01Q 13/10 |
| 2019/0319334 A1* | 10/2019 | Dai | H01Q 1/1271 |
| 2019/0393613 A1 | 12/2019 | Kakuya et al. | |
| 2021/0257711 A1 | 8/2021 | Furlan | |
| 2023/0068756 A1 | 3/2023 | Carper et al. | |

* cited by examiner

*Primary Examiner* — Awat M Salih
(74) *Attorney, Agent, or Firm* — The Webb Law Firm

(57) ABSTRACT

A windshield having an outer transparent ply that defines an inner surface and an outer surface oppositely disposed from the inner surface, an inner transparent ply that defines an outer surface and an inner surface oppositely disposed from the outer surface, an interlayer disposed between the inner surface of the outer transparent ply and the inner surface of the inner transparent ply, a circularly polarized antenna disposed on the outer surface of the inner transparent ply, an unidirectional antenna disposed on the inner surface of the outer transparent ply and the outer surface of the inner transparent ply, and a wideband antenna disposed on the outer surface of the inner transparent ply.

20 Claims, 27 Drawing Sheets

| Parameters | Size (mm) | Description |
|---|---|---|
| $W_g$ | 80 | width of ground 52 |
| $L_g$ | 77 | length of ground 52 |
| $W_s$ | 59.5 | width of slot 56 |
| $L_S$ | 55 | length of slot 56 |
| $L_t$ | 25 | length of tuning stub 54 |
| $W_t$ | 5.5 | width of tuning stub 54 |
| $L_{f1}$ | 11.6 | length of element 64a |
| $L_{f2}$ | 14.6 | length of element 64b |
| $W_{f3}$ | 3 | width of element 62 |
| a | 19.5 | Dimension of cross-shaped feed structure 60 reference to ground 52 |
| b | 20.5 | |
| c | 25 | |
| d | 31 | |
| e | 32 | |

FIG. 8

| **Parameters** | **Size (mm)** | **Description** |
|---|---|---|
| $W_{p1}$ | 9 | width of 1st patch 22a |
| $L_{p1}$ | 5.25 | length of 1st patch 22a |
| $W_{p2}$ | 8.75 | width of 2nd patch 22b |
| $L_{p2}$ | 5 | length of 2nd patch 22b |
| $W_{p3}$ | 8.5 | width of 3rd patch 22c |
| $L_{p3}$ | 4.75 | length of 3rd patch 22c |
| $W_g$ | 60 | width of 2nd conductive layer 24 |
| $L_g$ | 60 | length of 2nd conductive layer 24 |
| $L_{s1}$ | 14 | length of 1st slot 24a |
| $L_{s2}$ | 15 | length of 2nd slot 24b |
| $D_s$ | 6 | Distance between 1st and 2nd slot |
| $W_p$ | 0.5 | Distance between 1st ,2nd and 3rd patches |
| $W_s$ | 0.5 | Width of 1st and 2nd slot |

FIG. 17

ANTENNA

CROSS REFERENCE TO RELATED APPLICATIONS

This application claims priority to U.S. Provisional Application No. 63/519,071, filed Aug. 11, 2023, the disclosure of which is incorporated by reference in its entirety.

BACKGROUND OF THE INVENTION

Field of the Invention

The presently disclosed invention relates to antennas, and more particularly, to a high frequency antenna for automotive glass.

Description of Related Art

In automotive glazings such as windshields and back windows, antennas for the reception, and/or transmission of radio frequency waves such as AM, FM, TV, DAB, RKE, etc. are often carried on or incorporated in the glazing. Such antennas have been formed by printing conductive lines such as silver or copper onto a glazing transparency or by laminating metal wires or strips between transparency layers of the vehicle glazing. The antennas offer advantages of aerodynamic performance for the vehicle as well as provide an aesthetically pleasing, streamline appearance for the vehicle.

In recent years, the automotive industry has developed vehicles that are capable of communicating via radio frequency signals and other communication channels. These vehicles are sometimes referred to as "the connected car." New vehicle models offer a growing list of features such as safety improvements and features that enable Dedicated Short Range Communications (DSRC), radios for vehicle-to-vehicle (V2V), and vehicle-to-infrastructure (V2I) communications. Currently, the automotive industry is moving from assisted driving toward autonomous driving. Each new car connection, whether by cellular, WLAN, or DSRC, requires an antenna that supports the respective communication channel. In some cases, as many as six antennas may be required for cellular service and another six DSRC antennas for V2V and V2I communications. Designing antennas that can be accommodated by space that is available on the vehicle presents a significant challenge. Integrating antennas in the vehicle glazings offers advantages of improved aesthetics, simplified antenna packaging, reduced weight, discouraging theft and vandalism, and eliminating holes in the vehicle body that are prone to water invasion and other problems. Therefore, there has been a need for antennas that are capable of operating at high frequencies (e.g. above 1 GHz) and that can be mounted on a vehicle without protruding from the exterior of the vehicle or into the interior passenger compartment.

The rapid growth in connected vehicle communications has given rise to a need to integrate more and more antennas on the vehicle. There is, therefore, a need for cellular, DSRC, Wi-Fi, WLAN, and Bluetooth antennas that can be mounted to a surface of the vehicle, but that do not extend from the exterior of the vehicle or protrude into the interior passenger compartment. In addition, there is a practical need that such antennas can be accommodated by existing vehicle parts as standard equipment with minimum cost. Still further, it is also important that such antennas maintain the aesthetic or appearance of the vehicle and require only limited modification to existing glazing structure and manufacturing processes. Furthermore, there is also need for a single antenna having wide band characteristics which can receive and transmit over the entire 5G, Wi-Fi, and DSRC frequency band with unidirectional radiation to provide maximum reception capability.

SUMMARY OF THE INVENTION

The invention relates to a windshield comprising an outer transparent ply that defines an inner surface and an outer surface oppositely disposed from the inner surface, an inner transparent ply that defines an outer surface and an inner surface oppositely disposed from the outer surface, an interlayer disposed between the inner surface of the outer transparent ply and the inner surface of the inner transparent ply, a circularly polarized antenna disposed on the outer surface of the inner transparent ply, an unidirectional antenna disposed on the inner surface of the outer transparent ply and the outer surface of the inner transparent ply, and a wideband antenna disposed on the outer surface of the inner transparent ply.

In some non-limiting embodiments or aspects, the circularly polarized antenna may comprise a ground plane having four sides, wherein an inner edge of the four sides of the ground plane defines a slot therein, a cross-shaped antenna feeding structure, wherein the antenna feeding structure defines a first element and a second element, wherein the second element is substantially perpendicular to the first element, wherein the first element extends into the slot of the first side of the ground plane, a tuning stub extending from a second side of the ground plane, wherein the tuning stub extends substantially perpendicular to the second side and towards the antenna feeding structure. The slot and the antenna feeding structure may extend into the slot form a co-planar waveguide. The slot nay be a tapered slot wherein the slot is widened conically towards the inner edge of the first side of the ground plane. The slot may be configured to improve antenna impedance matching.

In some non-limiting embodiments or aspects, the circularly polarized antenna may comprise a coaxial cable, the coaxial cable comprising an outer shield and a center conductor, wherein the co-axial cable is connected to the co-planar waveguide, wherein a portion of the outer shield is in contact with the first side of the ground plane, and wherein the center conductor is connected to the first element of the antenna feeding structure. The co-planar waveguide may support wide impedance bandwidth.

In some non-limiting embodiments or aspects, the second element of the antennae feed structure may be configured for wideband antenna impedance tuning. The first element of the antenna feed structure may be configured to energize the circularly polarized antenna at a first mode. The tuning stub may be configured to excite the circularly polarized antenna to resonate at a second mode, wherein the first and the second mode are orthogonal modes having identical amplitude and in phase quadrature. The circularly polarized antenna may be configured to receive and transmit right-hand circularly polarized signals. The right-hand circularly polarized signals may be GNSS signals. The circularly polarized antenna may have wide bandwidth and covers GNSS L1, L2, L3, L4, and L5 bands from 1000 MHz to 1850 MHz. The ground plane may be rectangular.

In some non-limiting embodiments or aspects, the windshield may further comprise a nonconductive pane, and a film substrate adhered to the nonconductive pane, wherein the film substrate is disposed between the nonconductive pane and the circularly polarized antenna, and wherein the nonconductive pane is adhered to the outside surface of the inner transparent ply. The windshield may be a window, a black window, a roof window, a nonconductive transparent substrate, or a nonconductive opaque substrate. The ground plane may comprise at least one opening. The circularly polarized antenna may be configured to receive left-hand circularly polarized signals.

In some non-limiting embodiments or aspects, the unidirectional antenna may comprise a first conductive layer disposed between the inner surface of the outer transparent ply and the inner transparent ply, wherein the first conductive layer comprises a plurality of patches, wherein the plurality of patches comprise a first patch, a second patch, and a third patch, wherein the first conductive layer defines an outer perimeter, and wherein the plurality of patches are spaced apart and positioned in parallel and adjacent to each other, a second conductive layer disposed on the outer surface of the inner transparent ply, wherein the second conductive layer comprises a plurality of slots, wherein the second conductive layer defines an outer perimeter and the plurality of slots comprise a first slot and a second slot, wherein the second slot's length is greater than the first slot's length, wherein the second conductive layer is laterally aligned with respect to the first conductive layer such that the outer perimeter of the first conductive layer aligns inside the outer perimeter of the second conductive layer and the first slot aligns with an outer perimeter of the first patch, wherein the first slot of the second conducive layer is spaced apart from the plurality of patches of the first conductive layer such that electrical signals applied to the perimeter of the first slot are electromagnetically coupled to the plurality of patches of the first conductive layer, and a transmission line that electrically connects to the first slot at a feed position at a center of the first slot.

In some non-limiting embodiments or aspects, the second conducive layer may be the electrical ground element of the unidirectional antenna. The first slot may define a first longitudinal side and a second longitudinal, and wherein the first slot is a driving slot. The second slot may be longer than the first slot and spaced from the first slot on the first longitudinal side of the first slot such that transmitted signals from the driving slot reflected by the second slot have a phase difference of x when the signals radiated from the driving slot meet at the feed position. The second slot may be a reflector element slot.

In some non-limiting embodiments or aspects, the outer perimeter of the first patch may be laterally aligned with respect to the first longitudinal side of the first slot and overlaps the second longitudinal side of the first slot, wherein the first patch is positioned on a second longitudinal side of the first slot. Maximum electromagnetic field in the first slot may occur in the center of the first slot and wherein the maximum electrical field of the first patch occurs in a center edge of the first patch. Energy may be electromagnetically coupled between the first slot and the first patch. The first patch may be a first director of the unidirectional antenna.

In some non-limiting embodiments or aspects, the second patch and the third patch may be in parallel and in adjacent equally spaced to the first patch on the second longitudinal side of the first slot. The second patch may be a second director of the unidirectional antenna and wherein the third patch is a third director of the unidirectional antenna. The first, second, and third directors may be electromagnetically coupled to each other to pull the antenna radiation pattern towards the third director direction. The first slot and the second slot may be rectangular, L-shaped, or U-shaped. The transmission line may be a coaxial cable having a center conductor surrounded by an outer shield, wherein the outer shield is connected to the second longitudinal side of the first slot, and wherein the center conductor is connected to the first longitudinal side of the first slot. The coaxial cable and the first slot transmit and may receive electromagnetic energy to and from the second slot of the second conductive layer and first, second, and third patches of the first conductive layer. The second slot may reflect signals from the first slot and combine with first, second, and third patches of the first conductive layer to have the unidirectional antenna achieve unidirectional radiation. A bandwidth of the unidirectional antenna may cover WI-FI under IEEE 802.11a/ac standard from 5.18 GHz to 5.85 GHz and the DSRC band of 5.85 to 5.925 GHz.

In some non-limiting embodiments or aspects, lengths of the first slot and the first patch may determine a resonant frequency of the unidirectional antenna, and wherein widths of the first slot and the first patch affect the resonant resistance of the unidirectional antenna. The transmission line may be a microstrip line that is etched on a substrate attached to the outer surface of the inner transparent ply. The unidirectional antenna may be excited though two coupling stages, wherein one coupling stage is between the microstrip line and the first slot of the second conductive layer, and wherein one coupling stage is between the first slot and the second slot of the second conductive layer and the first, second, and third patches of the first conductive layer. The microstrip line may be oriented at right angles to the centerline of the first slot and turned at a right angle between the first and second slot such that the microstrip line only crosses the first slot. The unidirectional antenna may be embedded in a windshield, a back window, or a side window to produce a diversity antenna system having an omnidirectional far field radiation pattern in terrestrial direction.

In some non-limiting embodiments or aspects, the wideband antenna may comprises a dielectric substrate, a conductive sheet on the dielectric substrate, a first tapered slot radiator comprising a first slot opening formed in the conductive sheet, a first tapered opening formed in the conductive sheet, wherein the first tapered opening is formed between the first slot opening and the first side of the conductive sheet, wherein the first tapered opening gradually increases from the first slot opening towards the first side of the conductive sheet, and a first impedance matching opening in the conductive sheet formed in the shape of an oval adjacent the second end of the first slot opening, a second tapered slot radiator comprising a second slot opening formed in the conductive sheet, a second tapered opening formed in the conductive sheet, wherein the second tapered opening is formed between the second slot opening and the second side of the conductive sheet, wherein the second tapered opening gradually increases from the second slot opening towards second side of the conductive sheet, and a second impedance matching opening in the conductive sheet formed in the shape of an ovel adjacent the second end of the second slot opening, and a transmission line that electrically connected to the first and second slot openings.

In some non-limiting embodiments or aspects, the first slot opening and the second slot opening may be spaced apart and positioned in parallel and adjacent to each other. A center portion of the first slot opening and the second slot opening of the wideband antenna may define the antenna feed point. The transmission line across first slot opening and second slot opening may be configured to simultaneously excite the first tapered slot radiator and the second tapered slot radiator. The first tapered slot radiator may have a radiation beam towards the first side of the conductive sheet and the second tapered slot radiator has a radiation beam towards the second side of the conductive sheet. The size of the mouth of the first tapered slot radiator is bigger than the size of the mouth of the second tapered slot radiator opening. The first tapered slot radiator may be tuned for a lower frequency band and the second tapered slot radiator is tuned for a higher frequency band. The wideband antenna may be configured to transmit and receive 4G LTE and 5G sub-6 signals.

In some embodiments or aspects, the present disclosure may be characterized by one or more of the following numbered clauses:

Clause 1: A windshield comprising: an outer transparent ply that defines an inner surface and an outer surface oppositely disposed from the inner surface; an inner transparent ply that defines an outer surface and an inner surface oppositely disposed from the outer surface; an interlayer disposed between the inner surface of the outer transparent ply and the inner surface of the inner transparent ply; a circularly polarized antenna disposed on the outer surface of the inner transparent ply; an unidirectional antenna disposed on the inner surface of the outer transparent ply and the outer surface of the inner transparent ply; and a wideband antenna disposed on the outer surface of the inner transparent ply.

Clause 2: The windshield of clause 1, wherein the circularly polarized antenna comprises: a ground plane having four sides, wherein an inner edge of the four sides of the ground plane defines a slot therein; a cross-shaped antenna feeding structure, wherein the antenna feeding structure defines a first element and a second element, wherein the second element is substantially perpendicular to the first element, wherein the first element extends into the slot of the first side of the ground plane; and a tuning stub extending from a second side of the ground plane, wherein the tuning stub extends substantially perpendicular to the second side and towards the antenna feeding structure.

Clause 3: The windshield of clause 1 or 2, wherein the slot and the antenna feeding structure extending into the slot form a co-planar waveguide.

Clause 4: The windshield of any of clauses 1-3, wherein the slot is a tapered slot, and wherein the slot is widened conically towards the inner edge of the first side of the ground plane.

Clause 5: The windshield of any of clauses 1-4, wherein the slot is configured to improve antenna impedance matching.

Clause 6: The windshield of any of clauses 1-5, wherein the circularly polarized antenna comprises a coaxial cable, the coaxial cable comprising an outer shield and a center conductor, wherein the co-axial cable is connected to the co-planar waveguide, wherein a portion of the outer shield is in contact with the first side of the ground plane, and wherein the center conductor is connected to the first element of the antenna feeding structure.

Clause 7: The windshield of any of clauses 1-6, wherein the co-planar waveguide supports wide impedance bandwidth.

Clause 8: The windshield of any of clauses 1-7, wherein the second element of the antennae feed structure is configured for wideband antenna impedance tuning.

Clause 9: The windshield of any of clauses 1-8, wherein the first element of the antenna feed structure is configured to energize the circularly polarized antenna at a first mode.

Clause 10: The windshield of any of clauses 1-9, wherein the tuning stub is configured to excite the circularly polarized antenna to resonate at a second mode, wherein the first and the second mode are orthogonal modes having identical amplitude and in phase quadrature.

Clause 11: The windshield of any of clauses 1-10, wherein the circularly polarized antenna is configured to receive and transmit right-hand circularly polarized signals.

Clause 12: The windshield of any of clauses 1-11, wherein the right-hand circularly polarized signals are GNSS signals.

Clause 13: The windshield of any of clauses 1-12, wherein the circularly polarized antenna has wide bandwidth and covers GNSS L1, L2, L3, L4, and L5 bands from 1000 MHz to 1850 MHz.

Clause 14: The windshield of any of clauses 1-13, wherein the ground plane is rectangular.

Clause 15: The windshield of any of clauses 1-14, further comprising: a nonconductive pane; and a film substrate adhered to the nonconductive pane, wherein the film substrate is disposed between the nonconductive pane and the circularly polarized antenna, and wherein the nonconductive pane is adhered to the outside surface of the inner transparent ply.

Clause 16: The windshield of any of clauses 1-15, wherein the windshield is a window, a black window, a roof window, a nonconductive transparent substrate, or a nonconductive opaque substrate.

Clause 17: The windshield of any of clauses 1-16, wherein the ground plane comprises at least one opening.

Clause 18: The windshield of any of clauses 1-17, wherein the circularly polarized antenna is configured to receive left-hand circularly polarized signals.

Clause 19: The windshield of any of clauses 1-18, wherein the unidirectional antenna comprises: a first conductive layer disposed between the inner surface of the outer transparent ply and the inner transparent ply, wherein the first conductive layer comprises a plurality of patches, wherein the plurality of patches comprise a first patch, a second patch, and a third patch, wherein the first conductive layer defines an outer perimeter, and wherein the plurality of patches are spaced apart and positioned in parallel and adjacent to each other; a second conductive layer disposed on the outer surface of the inner transparent ply, wherein the second conductive layer comprises a plurality of slots, wherein the second conductive layer defines an outer perimeter and the plurality of slots comprise a first slot and a second slot, wherein the second slot's length is greater than the first slot's length, wherein the second conductive layer is laterally aligned with respect to the first conductive layer such that the outer perimeter of the first conductive layer aligns inside the outer perimeter of the second conductive layer and the first slot aligns with an outer perimeter of the first patch, wherein the first slot of the second conducive layer is spaced apart from the plurality of patches of the first conductive layer such that electrical signals applied to the perimeter of the first slot are electromagnetically coupled to the plurality of patches of the first conductive layer; and a transmission line that electrically connects to the first slot at a feed position at a center of the first slot.

Clause 20: The windshield of any of clauses 1-19, wherein the second conducive layer is the electrical ground element of the unidirectional antenna.

Clause 21: The windshield of any of clauses 1-20, wherein the first slot defines a first longitudinal side and a second longitudinal side, and wherein the first slot is a driving slot.

Clause 22: The windshield of any of clauses 1-21, wherein the second slot is longer than the first slot and spaced from the first slot on the first longitudinal side of the first slot such that transmitted signals from the driving slot reflected by the second slot have a phase difference of $\pi$ when the signals radiated from the driving slot meet at the feed position.

Clause 23: The windshield of any of clauses 1-22, wherein the second slot is a reflector element slot.

Clause 24: The windshield of any of clauses 1-23, wherein the outer perimeter of the first patch is laterally aligned with respect to the first longitudinal side of the first slot and overlaps the second longitudinal side of the first slot, wherein the first patch is positioned on a second longitudinal side of the first slot.

Clause 25: The windshield of any of clauses 1-24, wherein maximum electromagnetic field in the first slot occurs in the center of the first slot and wherein the maximum electrical field of the first patch occurs in a center edge of the first patch.

Clause 26: The windshield of any of clauses 1-25, wherein energy is electromagnetically coupled between the first slot and the first patch.

Clause 27: The windshield of any of clauses 1-26, wherein the first patch is a first director of the unidirectional antenna.

Clause 28: The windshield of any of clauses 1-27, wherein the second patch and the third patch are in parallel and in adjacent equally spaced to the first patch on the second longitudinal side of the first slot.

Clause 29: The windshield of any of clauses 1-28, wherein the second patch is a second director of the unidirectional antenna and wherein the third patch is a third director of the unidirectional antenna.

Clause 30: The windshield of any of clauses 1-29, wherein the first, second, and third directors are electromagnetically coupled to each other to pull the antenna radiation pattern towards the third director direction.

Clause 31: The windshield of any of clauses 1-30, wherein the first slot and the second slot are rectangular, L-shaped, or U-shaped.

Clause 32: The windshield of any of clauses 1-31, wherein the transmission line is a coaxial cable having a center conductor surrounded by an outer shield, wherein the outer shield is connected to the second longitudinal side of the first slot, and wherein the center conductor is connected to the first longitudinal side of the first slot.

Clause 33: The windshield of any of clauses 1-32, wherein the coaxial cable and the first slot transmit and receive electromagnetic energy to and from the second slot of the second conductive layer and first, second, and third patches of the first conductive layer.

Clause 34: The windshield of any of clauses 1-33, wherein the second slot reflects signals from the first slot and combine with first, second, and third patches of the first conductive layer to have the unidirectional antenna achieve unidirectional radiation.

Clause 35: The windshield of any of clauses 1-34, wherein a bandwidth of the unidirectional antenna covers WI-FI under IEEE 802.11a/ac standard from 5.18 GHz to 5.85 GHz and the DSRC band of 5.85 to 5.925 GHz.

Clause 36: The windshield of any of clauses 1-35, wherein lengths of the first slot and the first patch determine a resonant frequency of the unidirectional antenna, and wherein widths of the first slot and the first patch affect the resonant resistance of the unidirectional antenna.

Clause 37: The windshield of any of clauses 1-36, wherein the transmission line is a microstrip line that is etched on a substrate attached to the outer surface of the inner transparent ply.

Clause 38: The windshield of any of clauses 1-37, wherein the unidirectional antenna is excited through two coupling stages, wherein one coupling stage is between the microstrip line and the first slot of the second conductive layer, and wherein one coupling stage is between the first slot and the second slot of the second conductive layer and the first, second, and third patches of the first conductive layer.

Clause 39: The windshield of any of clauses 1-38, wherein the microstrip line is oriented at right angles to the centerline of the first slot and turned at a right angle between the first and second slot such that the microstrip line only crosses the first slot.

Clause 40: The windshield of any of clauses 1-39, wherein the unidirectional antenna is embedded in a windshield, a back window, or a side window to produce a diversity antenna system having an omnidirectional far field radiation pattern in terrestrial direction.

Clause 41: The windshield of any of clauses 1-40, wherein the wideband antenna comprises: a dielectric substrate; a conductive sheet on the dielectric substrate; a first tapered slot radiator comprising: a first slot opening having a first end and a second end formed in the conductive sheet; a first tapered opening formed in the conductive sheet, wherein the first tapered opening is formed between the first end of the first slot opening and the first side of the conductive sheet, wherein the first tapered opening gradually increases from the first end of the first slot opening towards the first side of the conductive sheet; and a first impedance matching opening in the conductive sheet formed in the shape of an ovel adjacent the second end of the first slot opening; a second tapered slot radiator comprising: a second slot opening having a first end and a second end formed in the conductive sheet; a second tapered opening formed in the conductive sheet, wherein the second tapered opening is formed between the first end of the second slot opening and the second side of the conductive sheet, wherein the second tapered opening gradually increases from the first end of the second slot opening towards second side of the conductive sheet; and a second impedance matching opening in the conductive sheet formed in the shape of an ovel adjacent the second end of the second slot opening; and a transmission line that electrically connected to the first and second slot openings.

Clause 42: The windshield of any of clauses 1-41, wherein the first slot opening and the second slot opening are spaced apart and positioned in parallel and adjacent to each other.

Clause 43: The windshield of any of clauses 1-42, wherein a center portion of the first slot opening and the second slot opening of the wideband antenna defines the antenna feed point.

Clause 44: The windshield of any of clauses 1-43, wherein the transmission line across first slot opening and second slot opening is configured to simultaneously excite the first tapered slot radiator and the second tapered slot radiator.

Clause 45: The windshield of any of clauses 1-44, wherein the first tapered slot radiator has a radiation beam towards the first side of the conductive sheet and the second tapered slot radiator has a radiation beam towards the second side of the conductive sheet.

Clause 46: The windshield of any of clauses 1-45, wherein the size of the mouth of the first tapered slot radiator is bigger than the size of the mouth of the second tapered slot radiator.

Clause 47: The windshield of any of clauses 1-46, wherein the first tapered slot radiator is tuned for a lower frequency band and the second tapered slot radiator is tuned for a higher frequency band.

Clause 48: The windshield of any of clauses 1-47, wherein the wideband antenna is configured to transmit and receive 4G LTE and 5G sub-6 signals.

BRIEF DESCRIPTION OF THE DRAWINGS

FIG. 8 is a table that lists the dimensions of the embodiment of the invention defined in FIG. 7;

FIG. 17 is a table that lists the dimensions of the invention identified in FIG. 16;

DESCRIPTION OF THE INVENTION

Figure 1:
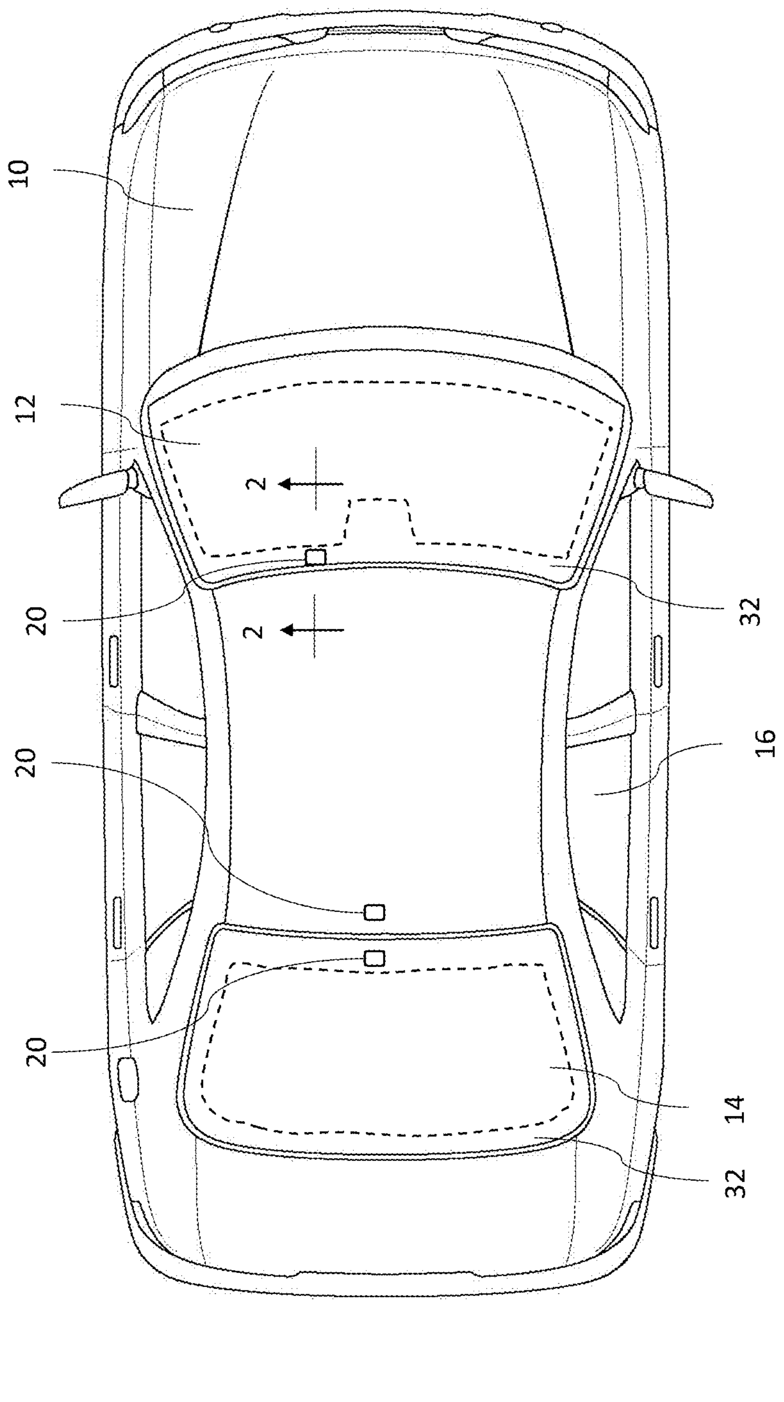
FIG. 1 is a view in perspective of a vehicle having at least one antenna according to one non-limiting aspect of the invention formed in its windshield, back window, and roof glass.

As used herein, spatial or directional terms, such as "left," "right," "inner," "outer," "above," "below," and the like, relate to the disclosure as it is shown in the drawing figures. However, it is to be understood that the disclosure can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "approximately" or "about." Accordingly, unless indicated to the contrary, the numerical values set forth in the following specification and claims may vary depending upon the desired properties sought to be obtained by the present disclosure. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

As used herein, "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

According to a non-limiting embodiment, FIG. 1 illustrates a vehicle 10 having a windshield 12, a backlite 14, and at least two side window glazings 16 on each side of the vehicle 10 according to a non-limiting embodiment or aspect. Windshield 12 and backlite 14 may include a concealment band 32 that is applied by screen printing opaque ink on the glazing and subsequently firing the perimeter of the window glass. The purpose of the concealment band 32 may be to conceal the antenna elements and other apparatus located near the glass edge. An antenna 20 is formed in windshield 12, within the silhouette of the concealment band 32 to minimize visibility of antenna 20. More than one antenna may be present in the concealment band 32 of the windshield 12. Although the embodiment of FIG. 1 shows that antenna 20 is formed in windshield 12, it may also be located in backlite 14, a side window glazing 16, or any other laminated glazing or sunroof on vehicle 10. Antenna 20 also may be formed in non-vehicular windows such as buildings.

Figure 2:
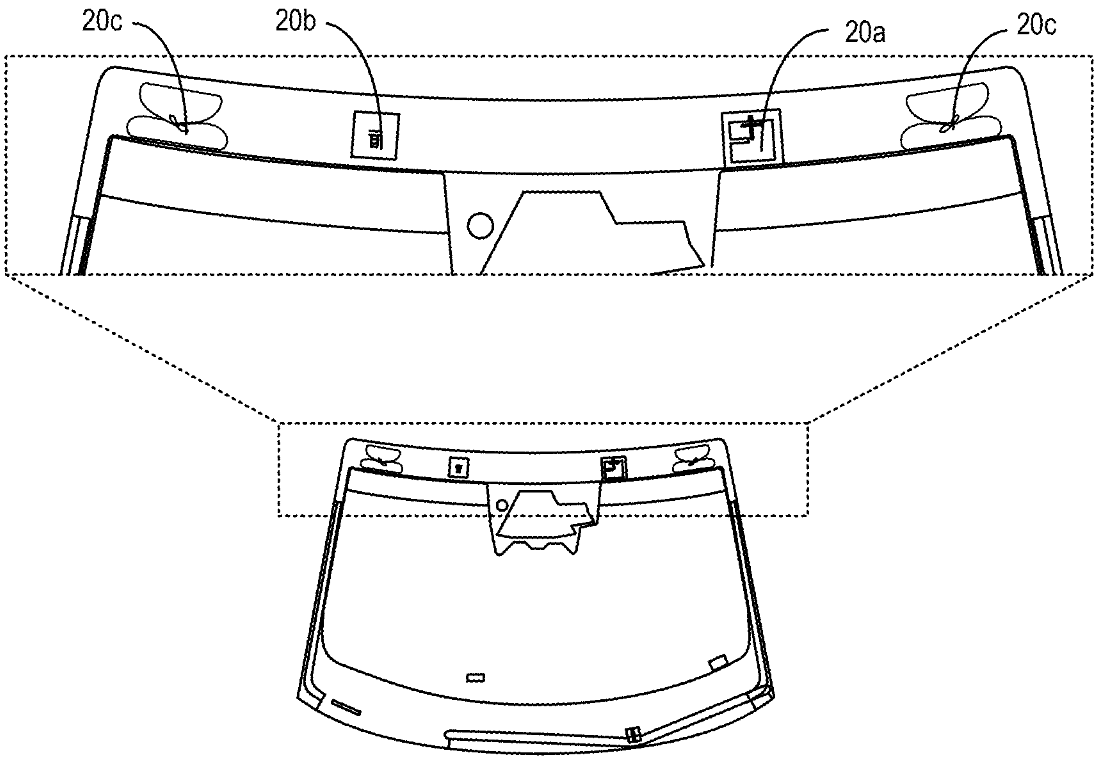
FIG. 2 is a top view of a windshield of the vehicle in FIG. 1 having at least one antenna according to a non-limiting aspect of the present invention.

According to a non-limiting embodiment, FIG. 2 illustrates the windshield 12 having at least one antenna 20. As illustrated, the windshield 12 has four antennas 20. It is appreciated that the windshield 12 may have any number of antennas 20. It is also appreciated that the at least one antenna 20 may be placed on the windshield 12 or any one of the side window glazings 16. The antennas 20 may be a circularly polarized antenna 20*a*, an unidirectional antenna 20*b*, or a wideband antenna 20*c*.

Figure 3:
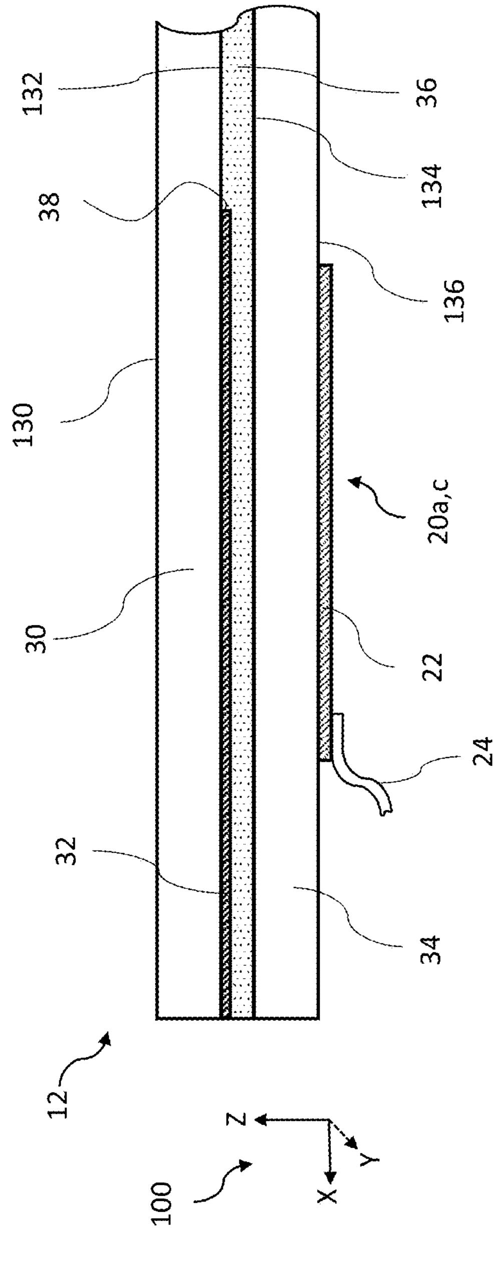
FIG. 3 is a partial cross-sectional view of a circularly polarized antenna along the line 2-2 on the windshield in FIG. 1 according to a non-limiting aspect of the invention.

According to a non-liming embodiment, FIG. 3 is a partial cross section view of a circularly polarized antenna 20*a* on windshield 12 along the line 2-2 in FIG. 1. Windshield 12 may be a laminated glazing that includes inner transparent ply 34 and outer transparent ply 30 that may be composed of glass. Inner transparent ply 34 and outer transparent ply 30 may be bonded together by an interlayer layer 36. Preferably, interlayer 36 may be made of a polyvinylbutyral (PVB) or similar material. Outer transparent ply 30 may define an outer surface 130 (conventionally referred to as the number 1 surface) that defines the outside of windshield 12 and an inner surface 132 (conventionally referred to as the number 2 surface). Inner surface 132 is oppositely disposed on outer transparent ply 30 from outer surface 130. Inner transparent ply 34 has an inner surface 134 (conventionally referred to as the number 3 surface) that faces internally on windshield 12 and an outer surface 136 (conventionally referred to as the number 4 surface) that defines the inside of windshield 12 and faces internally to the vehicle. Interlayer 36 is between surfaces 132 and 134. A coordinate system 100 is shown for the circularly polarized antenna 20 on the windshield 12. The x-axis and y-axis define a plan for the circularly polarized antenna 20*a* on the outer surface 136 of the inner transparent ply 34. The z-axis is directed out of the circularly polarized antenna 20*a* on the outside of windshield 12.

According to a non-limiting aspect of the invention, as shown in FIGS. 1 and 3, windshield 12 may include a concealment band 32 such as a paint band that is applied to outer transparent ply 30 by screen printing opaque ink around the perimeter of the inner surface 132 of outer transparent ply 30 and then firing the perimeter on the outer transparent ply 30. Concealment band 32 may have a closed inner edge 38 that defines the boundary of the daylight opening (DLO) of the windshield 12. Concealment band 32 may be sufficiently wide to cover the antenna 20 disposed in the windshield 12 as well as other apparatus that is included near the outer perimeter of the windshield 12.

With continued reference to FIG. 3, the windshield 12 may include a conductive layer 22 disposed on the outer surface 136 of inner transparent ply 34. Interlayer 36, inner transparent ply 34, and outer transparent ply 30 may act as a dielectric substrate for the conductive layer 22. The windshield 12 may include a transmission line 24 connected to the conductive layer 22. The conductive layer 22 may be implemented in many ways. For example, the conductive layers may be a conductive paint, a metallic film deposited by sputtering or vapor deposition, or a silver paste screen meshed to a nonconductive panel. Furthermore, the conductive layers may be formed on the surfaces of a single layer nonconductive pane such as a tempered glass window, or the surfaces of any one of the multilayer glass or plastic layers of a laminated transparency, or bonded on the surfaces of a non-conductive body panel, such as fiberglass, interior or exterior panel.

Figure 4:
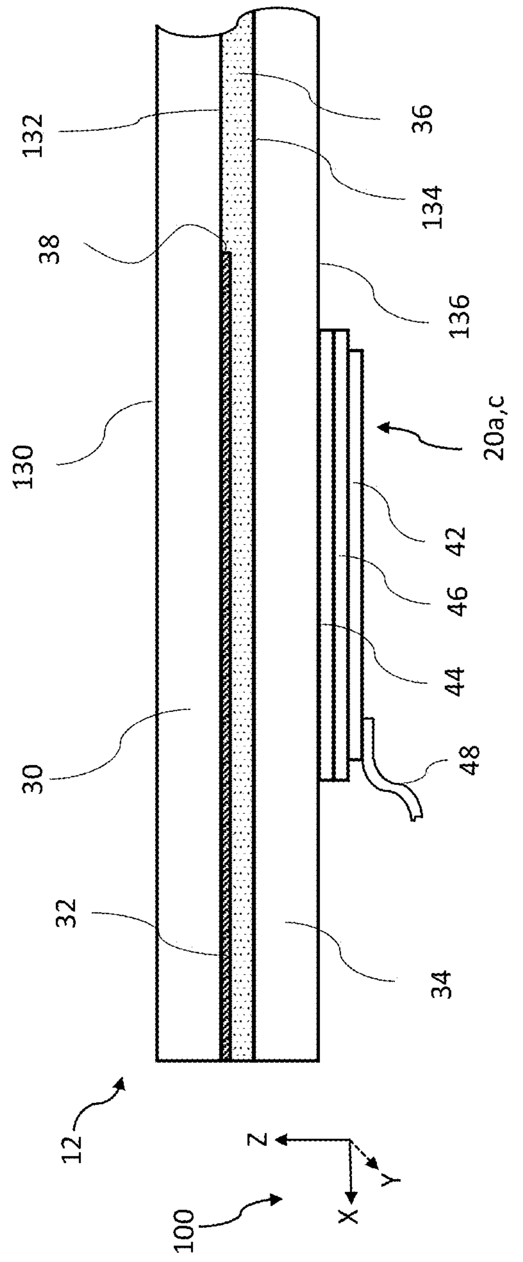
FIG. 4 is a partial cross-sectional view of a circularly polarized antenna along the line 2-2 on the windshield in FIG. 1 according to a non-limiting aspect of the invention.

According to a non-limiting aspect of the invention, FIG. 4 is a partial cross section view of a circularly polarized antenna 20*a* on windshield 12 along the line 2-2 in FIG. 1. Windshield 12 includes may include an inner transparent ply 34, an outer transparent ply 30, and an interlayer 36 therebetween. The circularly polarized antenna 20*a* may include a conductive layer 42 formed on a thin, flexible film substrate 46, such as polyester (PET), Kapton, mylar, or any other flexible dielectric substrate, and adhered to the outer surface 136 of inner transparent ply 34 by an adhesive layer 44. The adhesive layer 44 can be any suitable adhesive or transfer tape that effectively allows the substrate 46 to be secured to the inner transparent ply 34. A transmission line 48 may be connected to the conductive layer 42.

Figure 5A:
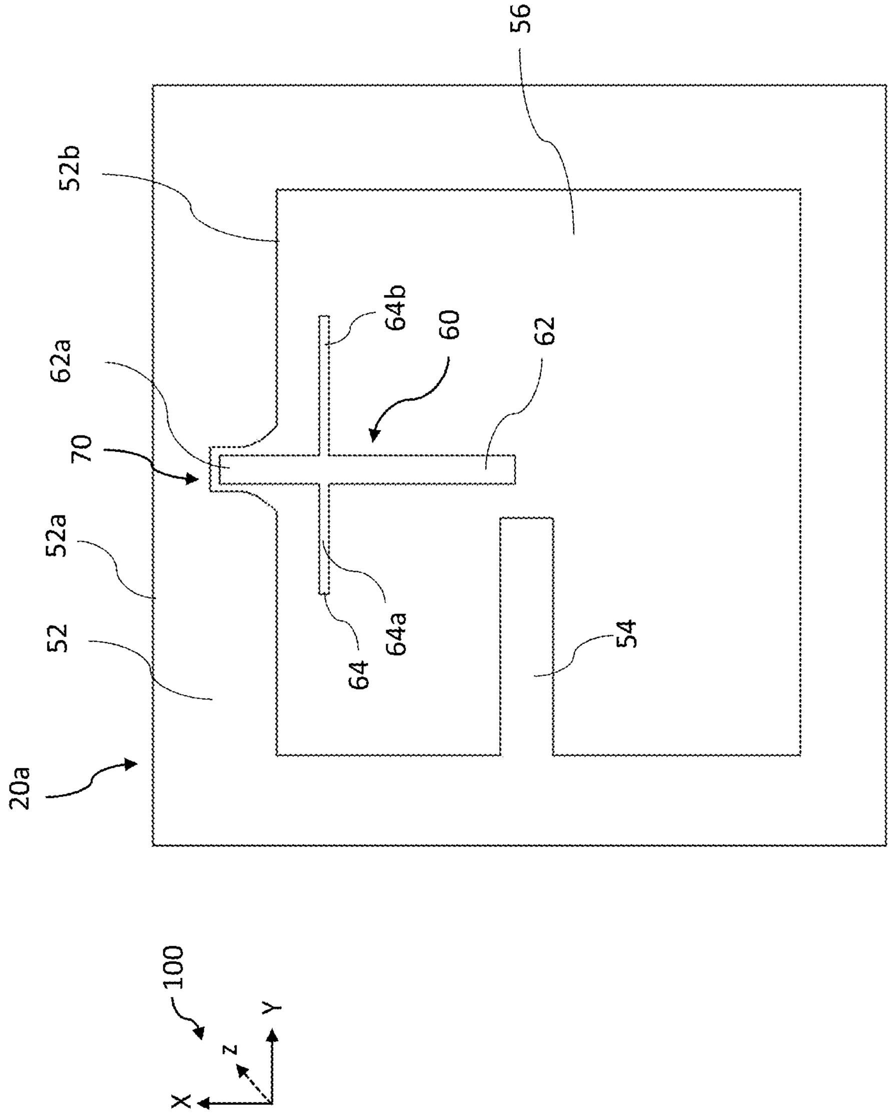
FIG. 5*a* is a top view of a circularly polarized antenna according to a non-limiting aspect of the invention.

According to a non-limiting aspect of the invention, FIG. 5*a* illustrates a structure of the circularly polarized antenna 20*a*. The circularly polarized antenna 20*a* may be a CPW fed rectangular slot antenna with a tuning stub 54 introduced on one side of the ground plane 52 to produce circularly polarized signals printed on a curved surface of a vehicle glass. The circularly polarized antenna 20*a* may be configured to operate in the GNSS frequency bands to transmit or receive right-hand circularly polarized signals over much of the upper half space ($z>0$) and left-hand circularly polarized signals over much of the lower half space ($Z<0$). The circularly polarized antenna 20*a* can be directly printed to vehicle glass or to a suitable substrate secured to vehicle glass. The circularly polarized antenna 20*a* may include a rectangular ring-shaped ground plane 52 having an outer edge 52*a* defining outer perimeter of the circularly polarized antenna 20*a* and an inner edge 52*b* defining a slot 56. The circularly polarized antenna 20*a* may be excited by a cross-shaped antenna feed structure 60 including a first element 62 and a second element 64. A portion 62*a* of the first element 62 may extend into a top side of the ground plane 52 to form a CPW feed line 70. The antenna feed structure 60 may enhance the coupling between the CPW feed line 70 and the slot 56. The ground plane 52 includes a tuning stub 54 extending into the slot 56 substantially perpendicularly from one side of the ground plane towards the first element 62 of the antenna feeding structure 60.

With continued reference to FIG. 5*a*, the second element 64 of cross-shaped antenna feed structure 60 may be used for tuning the impedance of the antenna 20*a* to 50Ω having a first portion 64*a* of the second element 64 and a second portion 64*b* of the second element 64 where the first portion 64*a* is primarily for high band tuning and the second portion 64*b* is for lower band tuning. Antenna 20*a* excited by the cross-shaped feed structure 60 may generate a first resonate mode while the tuning stub 54 introduced on the ground plane 52 generates a second resonate mode. The two orthogonal modes having the same amplitude and in phase quadrature hence produces circularly polarized signals. Review from the +z-direction, the surface current on the ground plane 52 travelling counter-clockwise direction at different phase instants (0°, 90°, 180° and 270°). The circularly polarized antenna 20*a* is able to generate an RHCP signals in the +z-direction, whereas an LHCP signal is produced in the −z-direction.

Figure 5B:
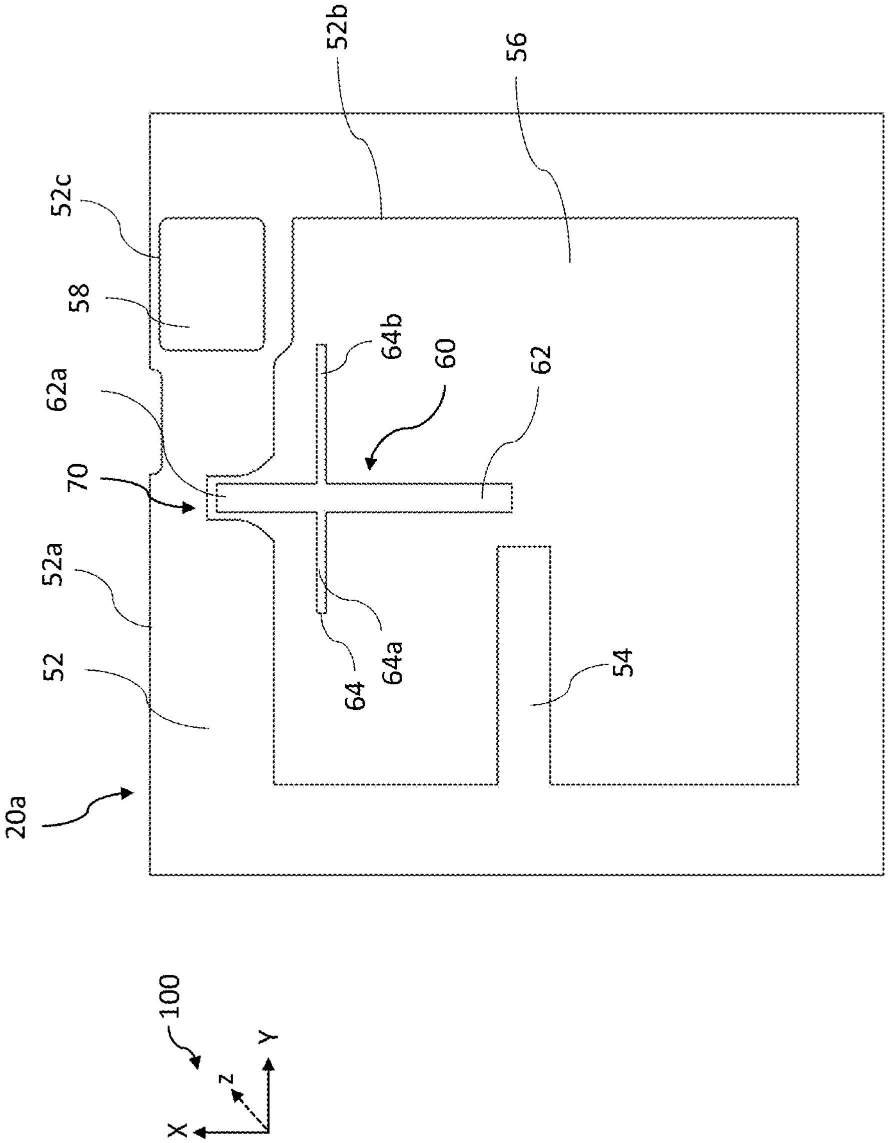
FIG. 5*b* is a top view of a circularly polarized antenna according to a non-limiting aspect of the invention.

In some non-limiting embodiments or aspects, the antenna structure may be altered due to constrain such as physical space or tooling required to produce antenna structures. Referring to FIG. 5*b*, a non-limiting aspect of a circularly polarized antenna 20*a* having a different antenna layout as the antenna 20*a* illustrated in FIG. 5*a* is shown. Referring to FIG. 5*b*, the circularly polarized antenna 20*a* includes an opening 58 defined by an edge 52*c* on the ground plane 52. More than one opening can be introduced on the sides of ground 52.

Figure 6A:
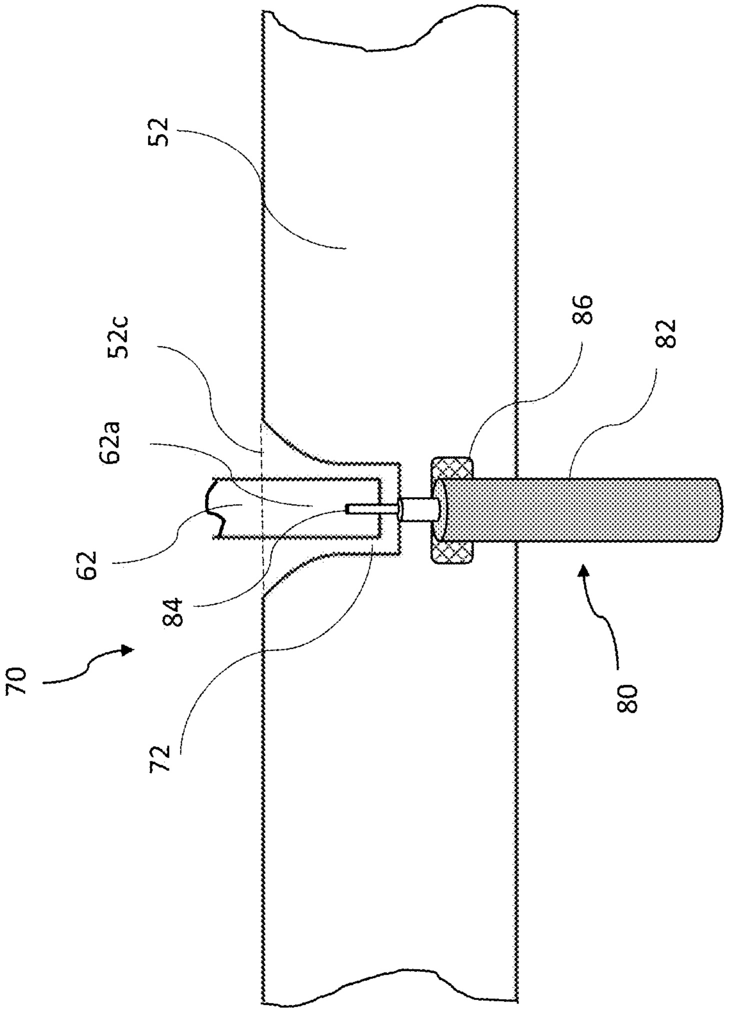
FIG. 6*a* is a top view of the antenna feed structure for a circularly polarized antenna according to a non-limiting aspect of the invention.

Referring to FIG. 6*a*, a co-planar waveguide 70 of a circularly polarized antenna 20*a* is shown according to a non-limiting aspect of the invention. An end portion 62*a* of the first element 62 of antenna feeding structure 60 may extend past the dotted line 52*c* into the top side of the ground plane 52. The end portion 62*a* that extends into the ground plane 52 may form a feed line 62*a*. The feed line 62*a* may be extended into the slot 72 of the ground plane and be separated from the ground plane 52. The slot 72 may be widened conically towards slot 56. The tapered slot 72 may improve antenna impedance matching. The co-planar waveguide supports wide impedance bandwidth and easy device integration using a single metallic layer on the same side of the substrate.

With continued reference to FIG. 6*a*, a transmission line shown. The transmission line may be a coaxial cable 80 having a center conductor 84 and an outer shield 82. The center conductor 84 is electrically connected to the feed line 62*a* while the outer shield 82 is electrically connected to the ground plane 52 through a solder pad 86 or any other means. For example, the coaxial cable 80 may be electrically connected to a transmitter (not shown) when antenna 20*a* is used as a transmitting antenna or a receiver (not shown) when antenna 20*a* is used as a receiving antenna. Furthermore, an amplifier, such as a low-noise amplifier (not shown) may be utilized to amplify the received signal on coaxial cable 80. The principle advantage of the present invention is that it combines the desired antenna electrical characteristics with physical component parts in a way that allows the antenna 20*a* to be easily incorporated into existing windshields or other transparency plys using existing manufacturing process and easily connected by conductive connections in convenient manners to the electronic circuitry.

Figure 6B:
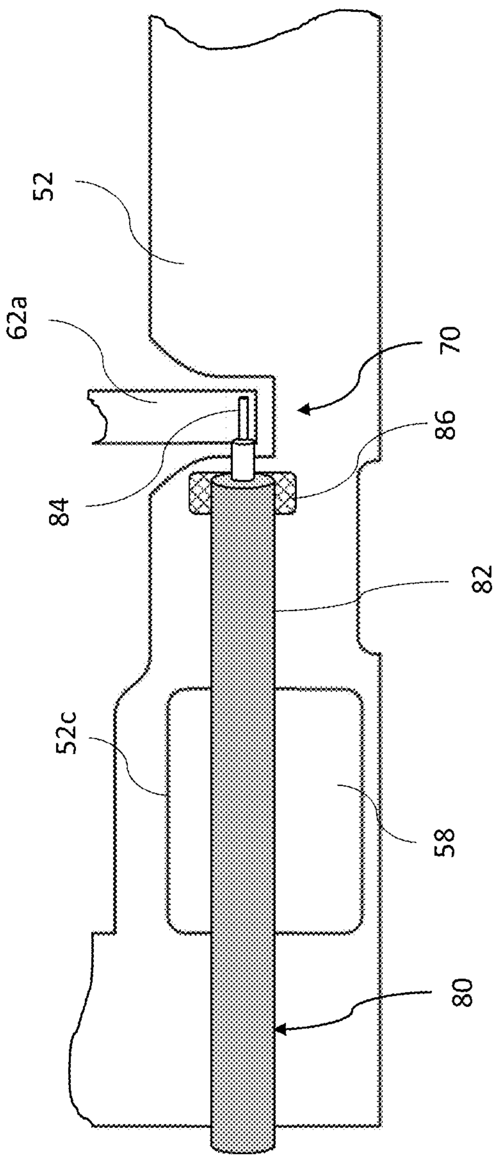
FIG. 6*b* is a top view of the antenna feed structure for a circularly polarized antenna according to a non-limiting aspect of the invention.

Referring to FIG. 6*b*, a co-planar waveguide 70 of a circularly polarized antenna 20*a* is shown according to an aspect of the invention. The transmission line may be a coaxial cable 80 that is positioned in parallel to one side of the ground plane 52 may be used to feed the antenna 20*a*. Coaxial cable 80 may include a center conductor 84 and an outer shield 82. The center conductor 84 is electrically connected to the feed line 62*a* while the outer shield 82 may be electrically connected to the ground plane 52 through a solder pad 86 or any other means. The opening 58 introduced on ground 52 may facilitate the over-molding process (not shown) to protect the connection joint of coaxial cable 80 and antenna 20*a*.

Figure 7:
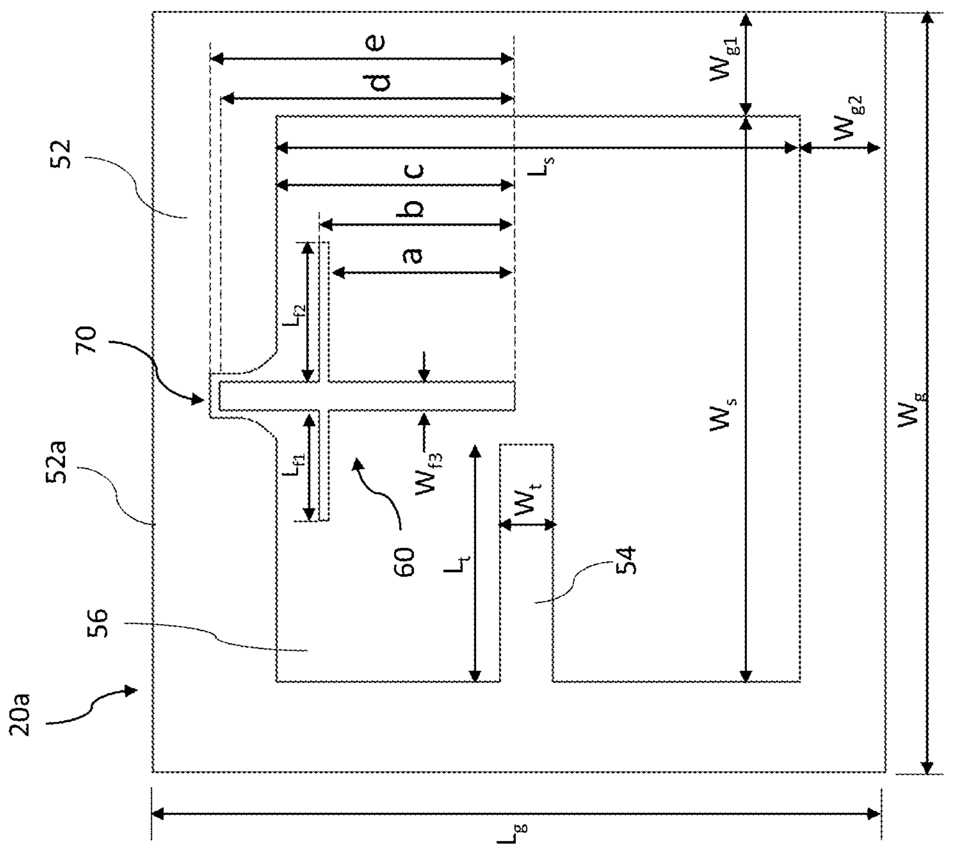
FIG. 7 is a plan view illustrating the dimensions of a circularly polarized antenna according to a non-limiting aspect of the invention.

Referring to FIG. 7, dimensions of a circularly polarized antenna 20*a* is shown according to an aspect of the invention. The size of rectangular loop shaped ground plane 52, the size of the co-planar waveguide 70, cross-shaped feed structure 60, and the size of the tuning stub 54 are designed as per the dimensions listed in FIG. 8. The antenna 20*a* may be printed on the outer surface 136 of inner transparent ply 34. The thickness of inner and outer transparent ply may be 2.3 mm respectively with a relative dielectric constant of 7.5 and a loss tangent of tan $\delta$=0.02. The thickness of interlayer 36 may be 0.8 mm with a relative dielectric constant of 3.3 and a loss tangent of tan $\delta$=0.05. The length Lg, Ls and the width Wg, Ws of the ground plane 52 and slot 56 determines the resonant frequencies of the antenna 20*a*. The co-planar waveguide 70 with cross-shaped antenna feed structure 60 support wide impedance bandwidth in the GNSS frequency bands. The right-hand circular polarization of the antenna is primarily caused by the tuning stub 54 introduced on the left side of ground plane 52.

Figure 9:
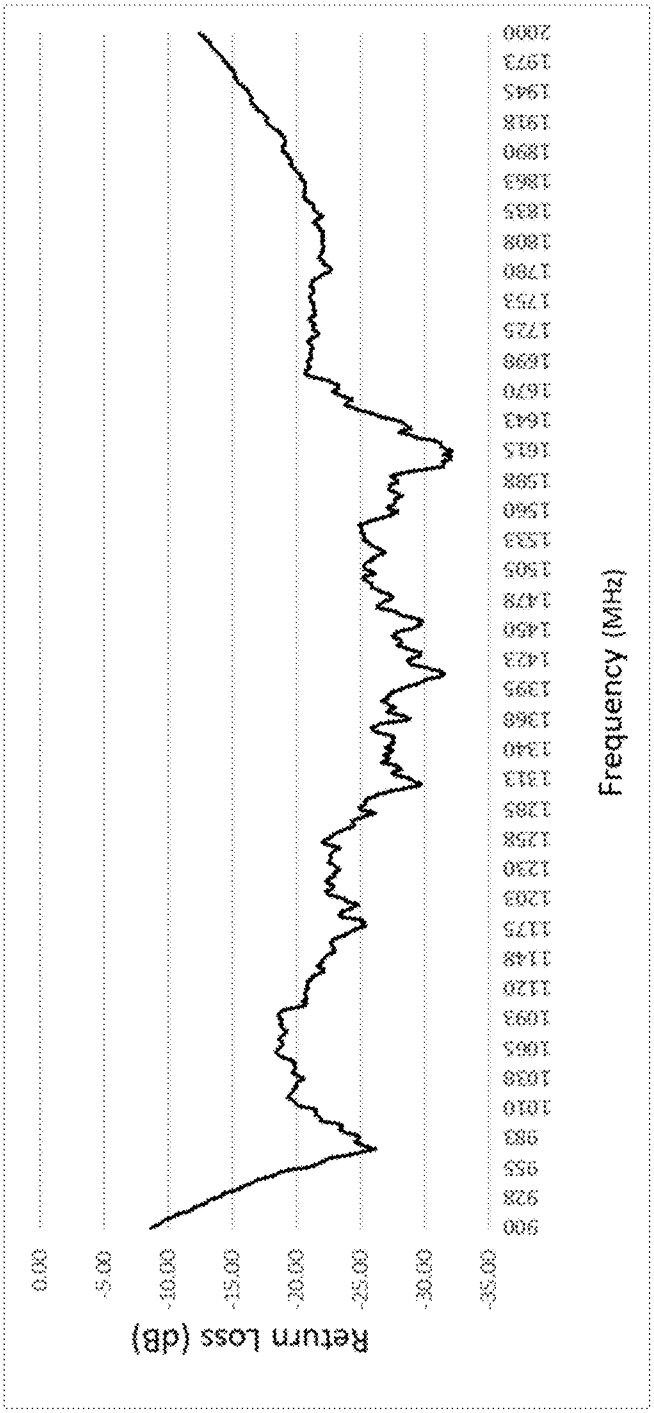
FIG. 9 is a graph illustrating the measured frequency response of the circularly polarized antenna as shown in FIG. 7.
Figure 10:
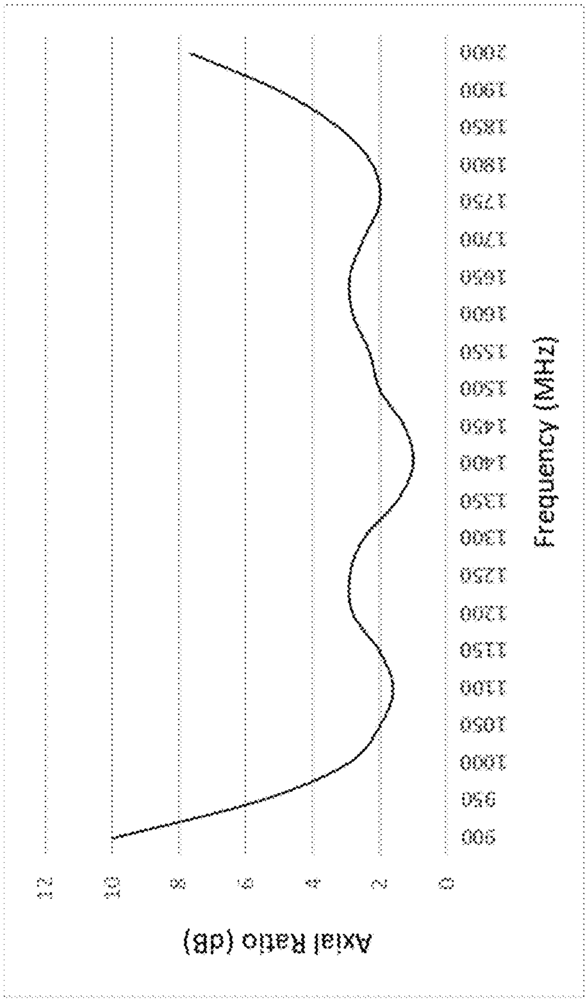
FIG. 10 is a graph illustrating the measured axial ratio of the circularly polarized antenna as shown in FIG. 7.

An embodiment shown in FIG. 7 with dimensions given in FIG. 8 was fabricated on a windshield for a car. The antenna 20*a* is located in the passenger side of the windshield 12 third visor area. FIG. 9 is the measured return loss (S11) plot of the antenna 20*a*. The return loss is observed to be below −10 dB from 910 MHz to 2000 MHz, which is 74.9% bandwidth with center frequency of 1455 MHz. The measured 3 dB axial ratio bandwidth is found to be 59.6% from 1000 MHz to 1850 MHz as shown in FIG. 10. This shows that the antenna covers the whole GNSS frequency bands in L5 (1176.45 MHz), L2 (1227.6 MHz), L4 (1379.913 MHz), L3 (1381.05 MHz), and L1 (1575.42 MHz) bands.

Figure 11:
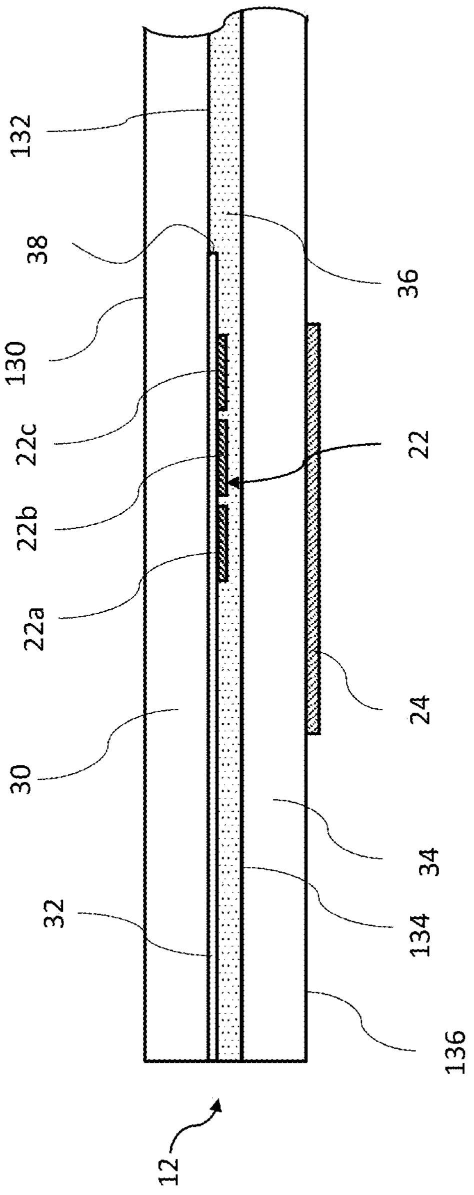
FIG. 11 is a partial cross-sectional view of an unidirectional antenna taken along line 2-2 on the windshield in FIG. 1 according to a non-limiting aspect of the invention.

Referring to FIG. 11, a unidirectional antenna 20*b* in the windshield 12 is shown according to a non-limiting aspect of the invention. The unidirectional antenna 20*b* may include a first conductive layer 22 and a second conductive layer 24. First conductive layer 22 may include a first patch 22*a*, a second patch 22*b*, and a third patch 22*c* disposed over the concealment band 32 on the inner surface 132 of the outer transparent ply 30. The second conductive layer 24 may be disposed on the outer surface 136 of inner transparent ply 34. The second conductive layer 24 may be substantially in parallel to and spaced away from the first conductive layer 22. The first patch 22*a*, the second patch 22*b*, and the third patch 22*c* are in parallel and symmetrically disposed with respect to a longitudinal axis intersecting the geometry center of second conductive layer 24. Interlayer 36 and inner transparent ply 34 may act as a dielectric substrate for the first conductive layer 22 and the second conductive layer 24.

With continued reference to FIG. 11, the first conductive layer 22 and second conductive layer 24 may be implemented in other ways that are further illustrated herein by way of example. First and second conductive layers 22, 24 may be composed of conductive paint, metallic film deposited by sputtering or vapor deposition, and silver paste screen meshed to a nonconductive panel. Furthermore, the first and second conductive layers 22, 24 may be formed on the surfaces of a single layer nonconductive pane such as a tempered glass window, or on the surfaces of any layer in a multilayer laminated transparency of glass or plastic layers. The first and second conductive layers 22, 24 also may be bonded to the surfaces of a non-conductive body panel, such as an interior or exterior fiberglass panel.

Figure 12:
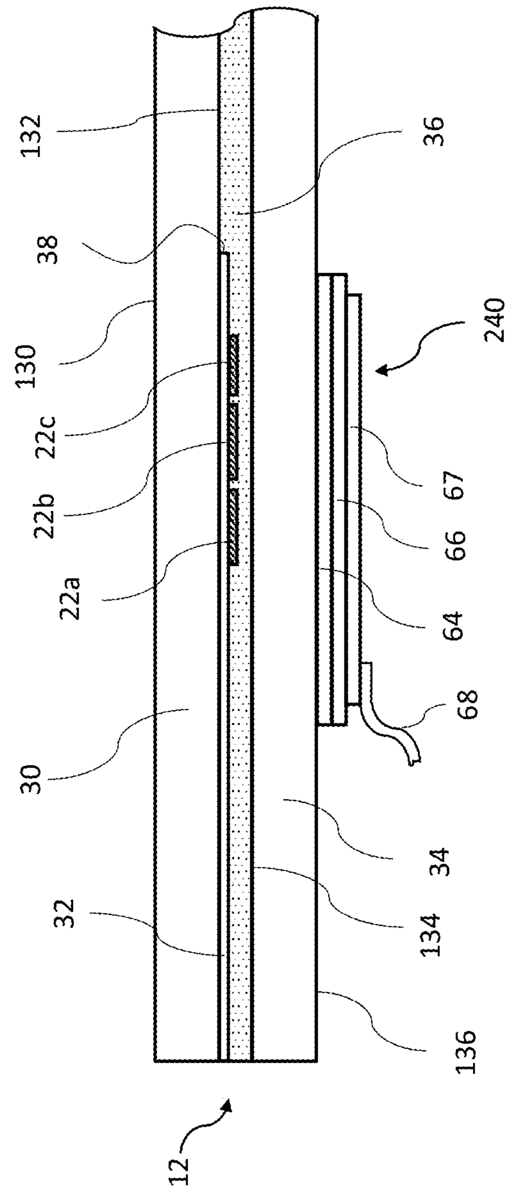
FIG. 12 is a partial cross-sectional view of an unidirectional antenna taken along line 2-2 on the windshield in FIG. 1 according to a non-limiting aspect of the invention.

Referring to FIG. 12, a unidirectional antenna 20*b* is shown according to a non-limiting aspect of the invention. The second conductive layer 24 may be replaced with an attachment 240 as an add-on to the windshield 12 after it is fabricated. Windshield 12 may include an inner transparent ply 34, an outer transparent ply 30 and an interlayer 36 therebetween. The attachment 240 may include a conductive layer 67 formed on a thin, flexible film substrate 66, such as polyester (PET), Kapton, mylar, or any other flexible dielectric substrate, and adhered to the outer surface 136 of the inner transparent ply 34 by an adhesive layer 64. The adhesive layer 64 can be any suitable adhesive or transfer tape that effectively allows the substrate 66 to be secured to the inner transparent ply 34. A transmission line 68 may be connected to the first conductive layer 22.

Figure 13:
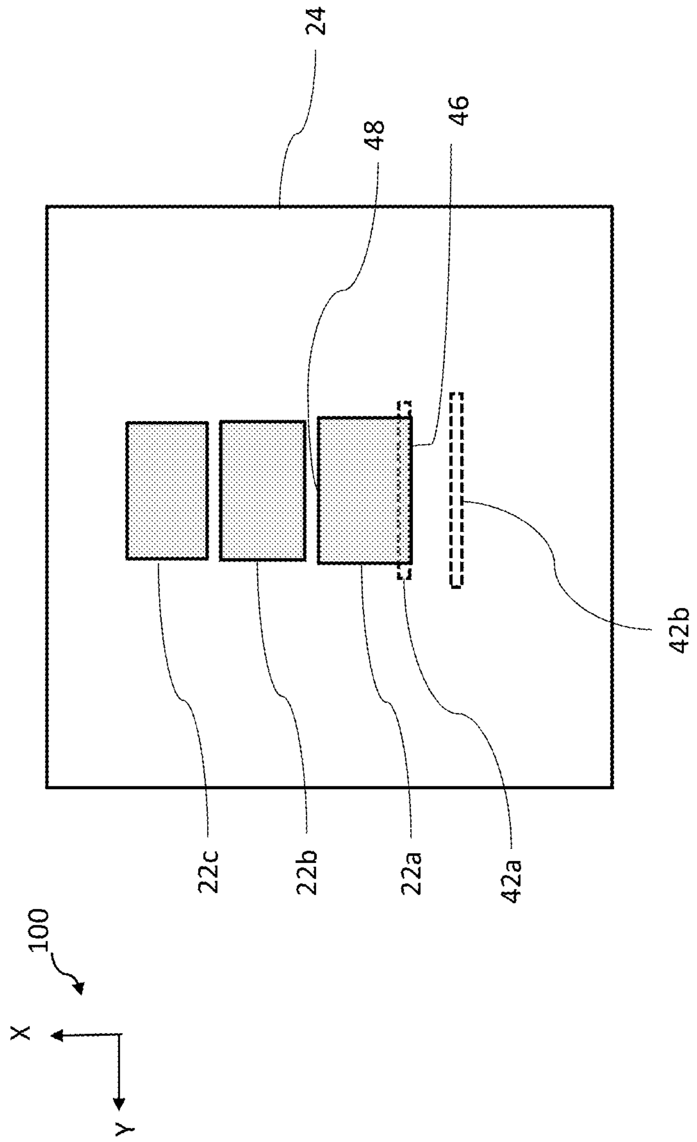
FIG. 13 is a top view of an unidirectional antenna according to a non-limiting aspect of the invention.
Figure 14:
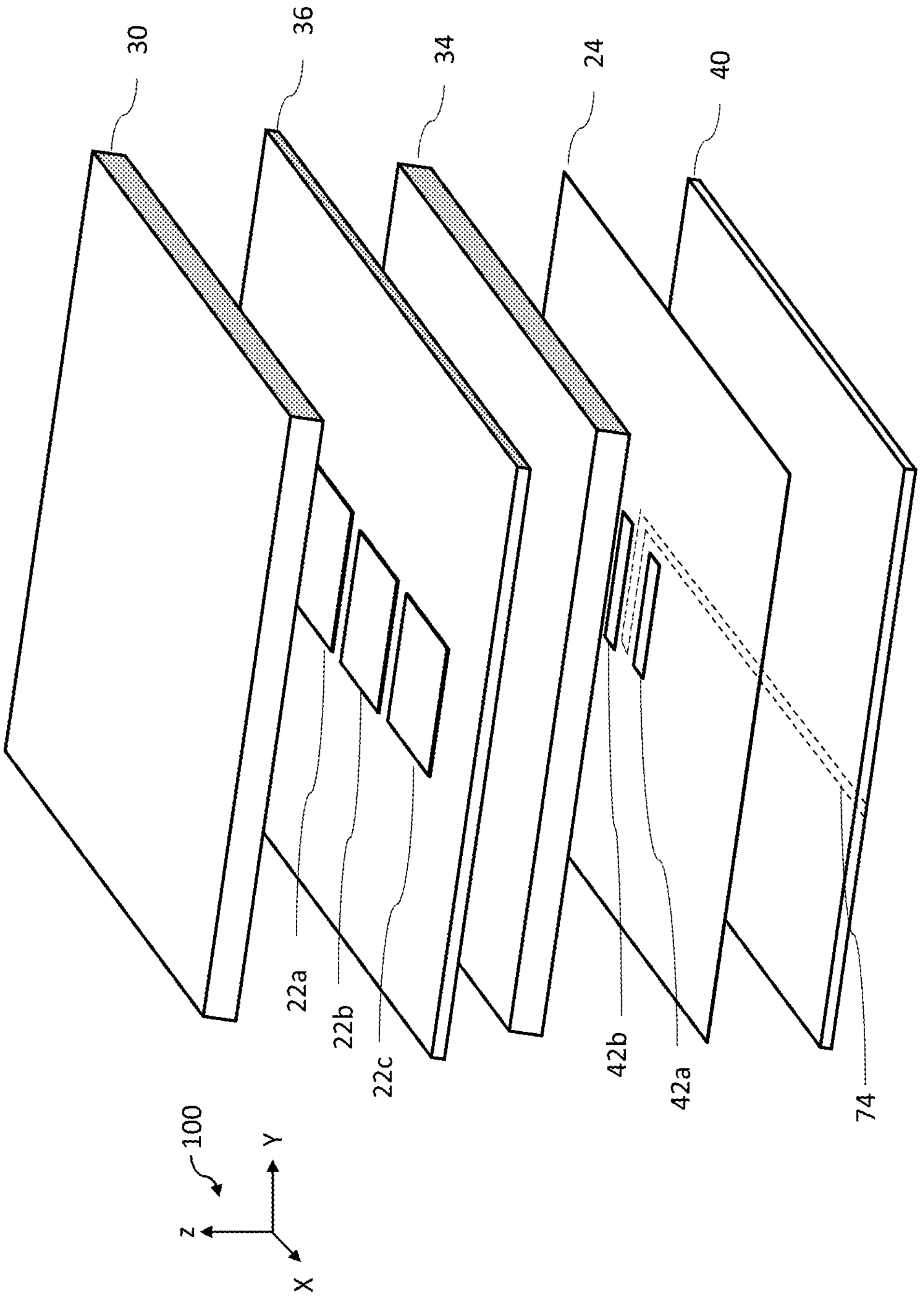
FIG. 14 is an exploded view of an unidirectional antenna having a microstrip feed line according to a non-limiting aspect of the invention.
Figure 15:
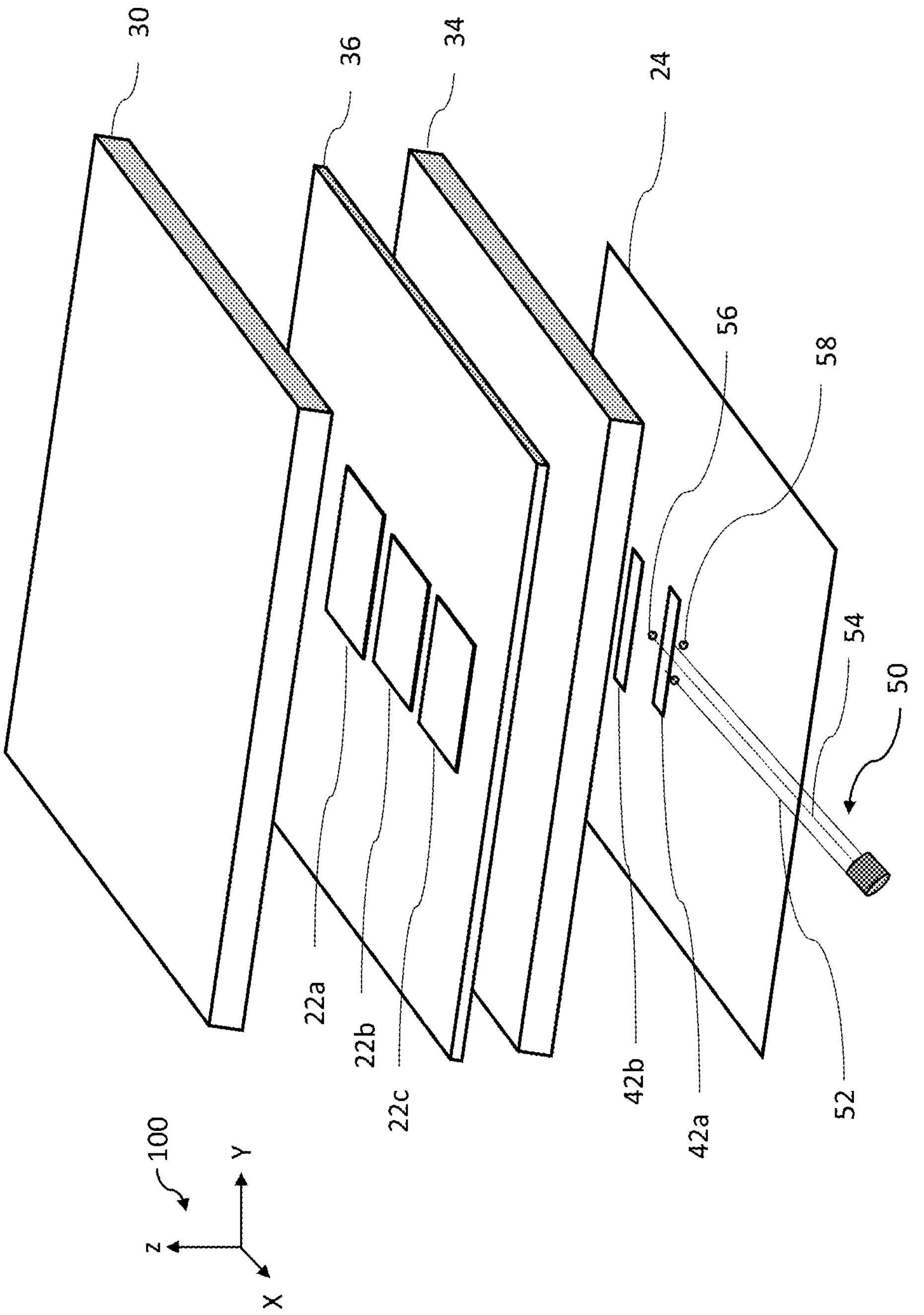
FIG. 15 is an exploded view of an unidirectional antenna having a coaxial cable feed line according to a non-limiting aspect of the invention.

Referring to FIGS. 13-15, patches 22*a*, 22*b*, and 22*c* of first conductive layer 22 may be the directors of the unidirectional antenna 20*b*. Patches of first conductive layer 22 may have any given profile shape such as, for example, rectangular, circular, triangular, or elliptical. In the example of the disclosed embodiment, a rectangular profile shape is preferred. Second conductive layer 24 may act as an electrical ground plane. First conductive layer 22 may cooperate with the second conductive layer 24, the interlayer 36, and the inner transparent ply 34 to define a structure of the unidirectional antenna 20*b*. The second conductive layer 24 may define a first slot 42*a* and a second slot 42*b*. The first slot 42*a* may be disposed transversely on the second conductive layer 24 and is symmetrically disposed with respect to a longitudinal axis intersecting the center of second conductive layer 24. The second slot 42*b* may be positioned parallel to and in spaced relation to the first slot 42*a*, and the second slot 42*b* may have a greater length than the first slot 42*a*. The first slot 42*a* and the second slot 42*b* may have various profiles and shapes such as, for example, straight, L-shaped, or U-shaped slot.

With continued reference to FIGS. 13-15, when a signal transmission line is connected to the periphery of the first slot 42*a*, the first slot 42*a* would become a driven element. In this respect, the second slot 42*b* may serve as a parasitic element that can serve as a director or reflector depending on its relative length compared to the driven element and distance from the driving element. The transmitted waves from the driven element 42*a* are reflected by the parasitic element 42*b*. When the waves radiated from the driven slot meet 42*a* at feed position again having the round-trip phase difference of, the transmitted and reflected signals canceled with each other and the parasitic element serves as a reflector. When the phase difference between the transmitted and reflected signals is $2\pi$ the constructive interference happens. In this condition, the parasitic element 42*b* serves as a director. The second slot 42*b* may be longer than the first slot 42*a* and serve as a reflector.

FIG. 13 is a top view of a unidirectional antenna 20*b*. The unidirectional antenna 20*b* includes a first conductive layer 22 and a second conductive layer 24, wherein the first conductive layer 22 includes three rectangular patches 22*a*, 22*b* and 22*c* and the second conductive layer 24 incudes two rectangular slots 42*a* and 42*b*. The first slot 42*a* is the driven slot that can be excited by a transmission lime. The second slot 42*b* may be longer than the first slot 42*a* and positioned to serve as a reflector slot such that more signals radiated towards the "+x" direction. Energy is electromagnetically coupled through the driven slot 42*a* in the second conductive layer 24. Three rectangular patches 22*a*, 22*b*, 22*c* on first conductive layer 22 are parasitic patches serving as antenna directors. The first slot 42*a* may be oriented with respect to the center edge of first patch 22*a* of first conductive layer 22 because that is the location of the maximum electrical field of the first patch 22*a*. To achieve maximum coupling, the first slot 42*a* may be parallel to and overlap the radiating edges 46 of the first patch 22*a*. Patches 22*a*, 22*b*, and 22*c* may serve as directors to the unidirectional antenna and further direct the energy towards "+x" direction to increase the antenna gain. Three directors are preferred because adding additional directors has limited impact on antenna gain.

Referring to FIG. 14, a unidirectional antenna 20*b* is fed by a microstrip line 74 that is etched on the bottom of a thin substrate 40 according to a non-limiting aspect of the invention. The unidirectional antenna 20*b* is excited by two very similar coupling mechanisms, one coupling mechanism between microstrip line 74 and the first slot 42*a* and a second coupling mechanism between slot 42*a*, slot 42*b*, and the patches (22*a*, 22*b*, and 22*c*) on the first conductive layer 22. The characteristic impedance of microstrip line 74 and the width of microstrip line 74 affect electromagnetic coupling to the first slot 42*a*. For maximum coupling, microstrip line 74 is oriented to with respect to the first slot 42*a* such that the longitudinal dimension of microstrip line 74 is oriented at right angles to the longitudinal centerline of the first slot 42*a* which is defined as the midpoint between the long-side edges of the first slot 42*a*. After crossing the first slot 42*a* microstrip line 74 is turned at a right angle between first slot 42*a* and the second slot 42*b* such that the microstrip line 74 only excite the first slot 42*a*, and the second slot 42*b* may serve as a parasitic reflector to the slot antenna. A coordinate system 100 is shown for the unidirectional antenna 20*b* on the windshield 12. The x-axis and y-axis define a plan for the antenna 20*b* on the outer surface 136 of the inner transparent ply 34. The z-axis is directed out of the unidirectional antenna 20*b* into the outside of windshield 12.

Referring to FIG. 15, a unidirectional antenna 20*b* according to a non-limiting aspect of the invention is shown. The unidirectional antenna 20*b* may be fed directly through the first slot 42*a* using a coaxial cable 50 that has a center conductor 54 and an outer shield 52. The center conductor 54 may extend over the first slot 42*a* and may be galvanically connected to the furthest side of the first slot 42*a* at a solder pad 56 on the second conductive layer 24. Outer shield 52 may be galvanically connected to the near side of the first slot 42*a* at a solder pad 58 on second conductive layer 24. The second slot 42*b* may be longer than the first slot 42*a* and serve as a reflector while patches 22*a*, 22*b*, and 22*c* serve as directors to the first slot 42*a*. An advantage of the presently disclosed invention is that it combines advantageous electrical characteristics of the antenna with physical component parts such that the antenna may be more readily incorporated in current windshield designs or other transparency designs using existing manufacturing processes. Another advantage of the presently disclosed antenna is that it is more easily and conveniently connected by conductive connections to electronic circuitry that is external to the antenna.

Figure 16:
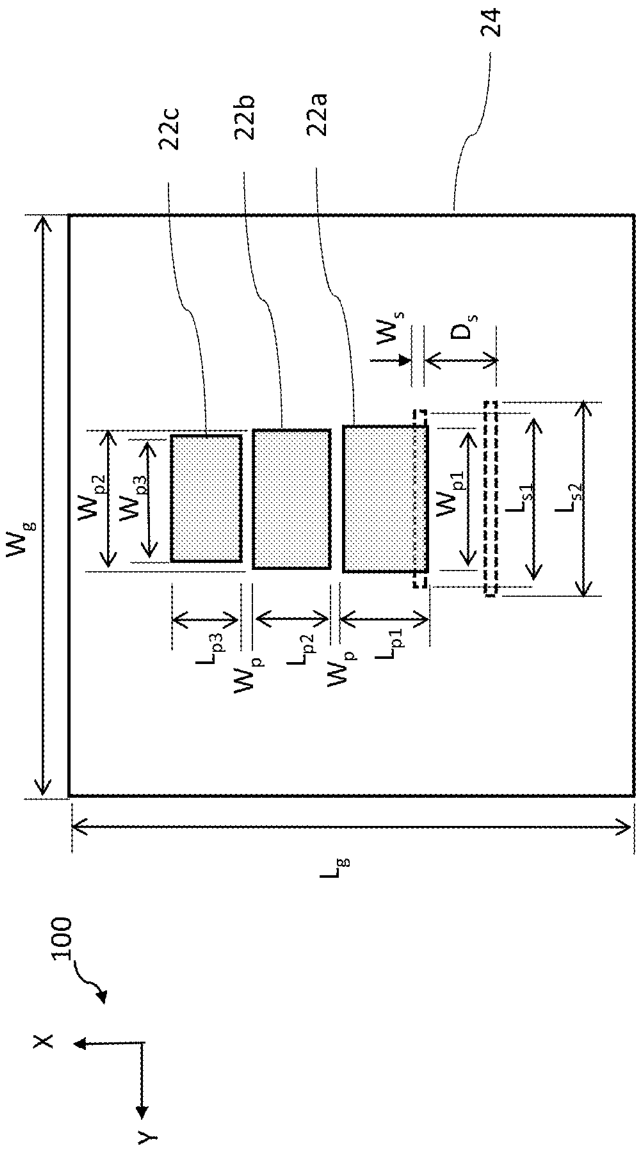
FIG. 16 is a plan view identifying selected dimensions of an unidirectional antenna according to a non-limiting aspect of the invention.

Referring to FIG. 16, illustrative dimensions of a unidirectional antenna are shown according to a non-limiting aspect of the invention. Patch elements 22*a*, 22*b*, and 22*c* of the first conductive layer 22, the second conductive layer 24, and the slots 42*a* and 42*b* are all relatively sized according to the dimensions listed in FIG. 17. The length $L_{s1}$ of slot

42*a* and the length $L_{p1}$ of patch 22*a* determines the resonant frequencies of the slot antenna. The width $W_{s1}$ of the first slot 42*a* and the width $W_{p1}$ of the first patch 22*a* affects the resonant resistance of the slot antenna, with a wider patch producing a lower resistance. The coupling level between the first slot 42*a* and the first patch 22*a* is primarily determined by the length $L_{s1}$ of the first slot 42*a*, as well as the back-radiation level. The length $L_{s2}$ of the second slot 42*b* is longer than length $L_{s1}$ of the first slot 42*a* such that the second slot 42*b* serves as a reflector to the first slot 42*a*. Patches 22*a*, 22*b*, and 22*c* serve as directors to the slot antenna with the first patch 22*a* slightly bigger than the second patch 22*b* and the second patch 22*b* is slightly bigger than the third patch 22*c*. The patches are closely deposited in parallel such that they are electromagnetically coupled to each other to pull the antenna radiation pattern towards the "+x" direction.

Figure 18:
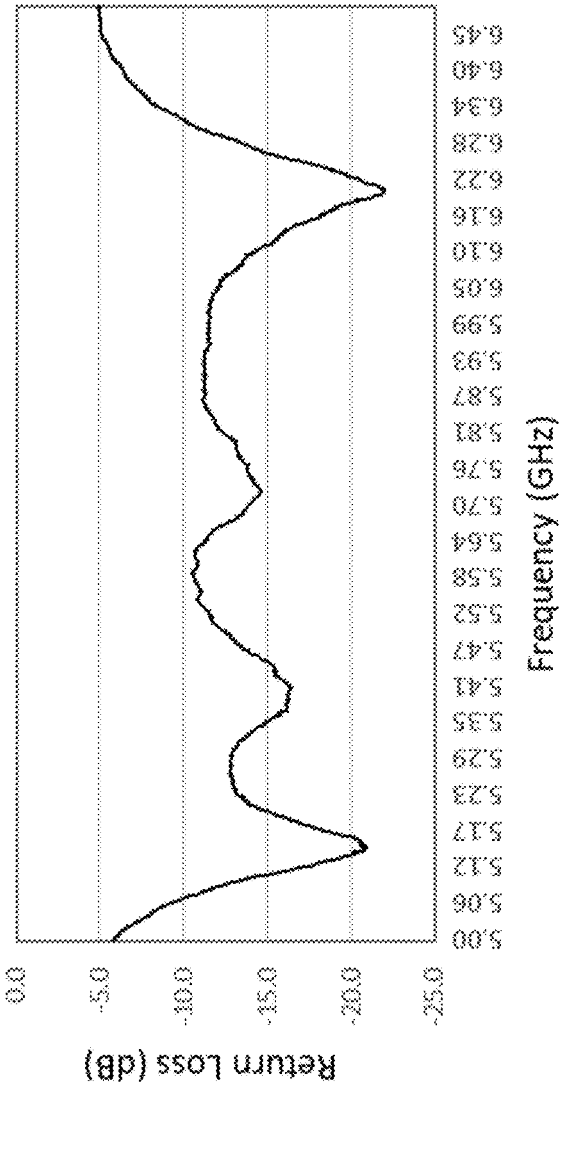
FIG. 18 is a graph illustrating measured frequency response of the unidirectional antenna shown in FIGS. 13, 16, and 17.

An embodiment of the patch antenna shown in FIGS. 13, 15, and 16 with dimensions specified in FIG. 17 was fabricated on a windshield of a 2023 Cadillac Celestiq electric vehicle. The unidirectional antenna was positioned on the top passenger side next to the third visor area of the windshield. The unidirectional antenna is positioned behind the black paint band, therefore it's invisible. FIG. 18 is a measured return loss (S11) plot of the antenna. Of the power delivered to the antenna, return loss S11 is a measure of how much power is reflected from the antenna and how much is "accepted" by the antenna and radiated. FIG. 18 shows that the return loss is below −10 dB in the frequency range from 5.1 to 6.3 GHz. This means that the antenna can be used in UNII, ISM, IEEE 802.11a and 802.11ac, Radio Local Area Networks (RLAN), Fixed Wireless Access Systems (FWA), WiMAX and MESH wireless networks from 5.18 to 5.85 GHz as well as DSRC band of 5.85 to 5.925 GHz.

Figure 19:
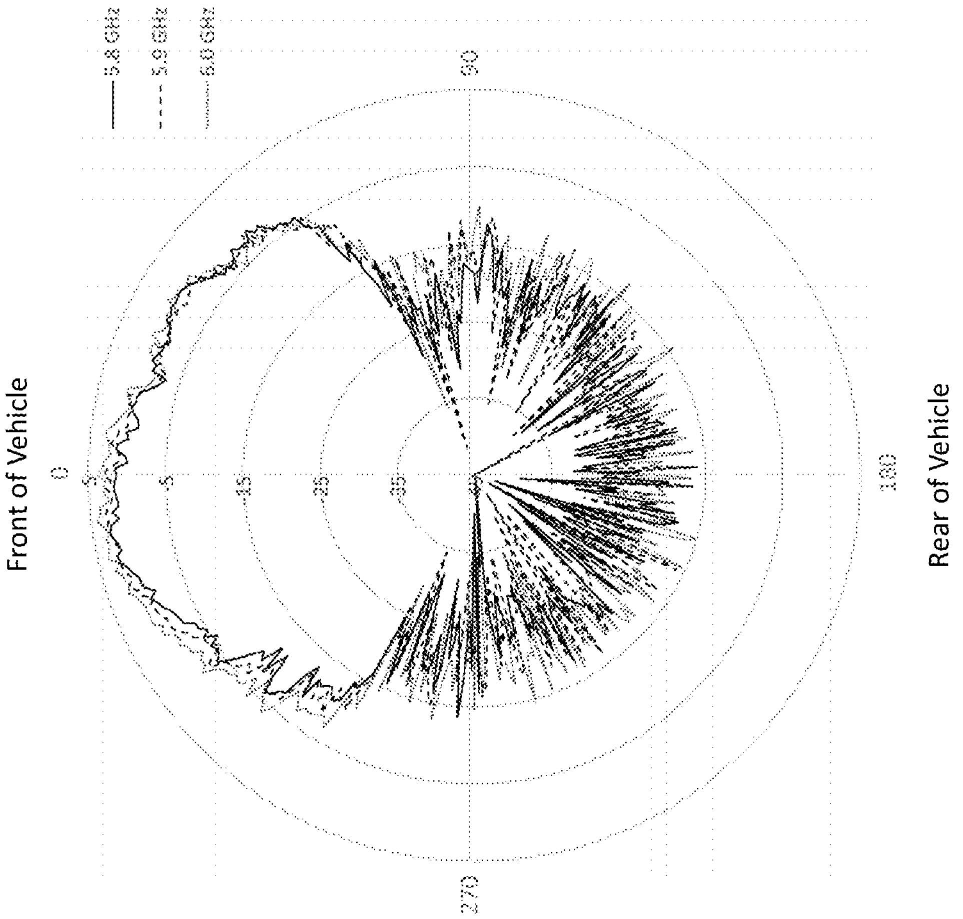
FIG. 19 is a graph illustrating vertically polarized gain pattern of the unidirectional antenna taken at DSRC frequencies and at 0° elevation angle.

Referring to FIG. 19, the vehicle antenna gain pattern was measured on an outdoor antenna range. The vehicle antenna radiation pattern for vertical polarization at frequencies of 5.8 GHz, 5.9 GHz, and 6.0 GHz respectively are shown. The elevation angle is 0°. The patch antenna maximum gain is about 2 dBi and directed to the front of the vehicle.

Figure 20:
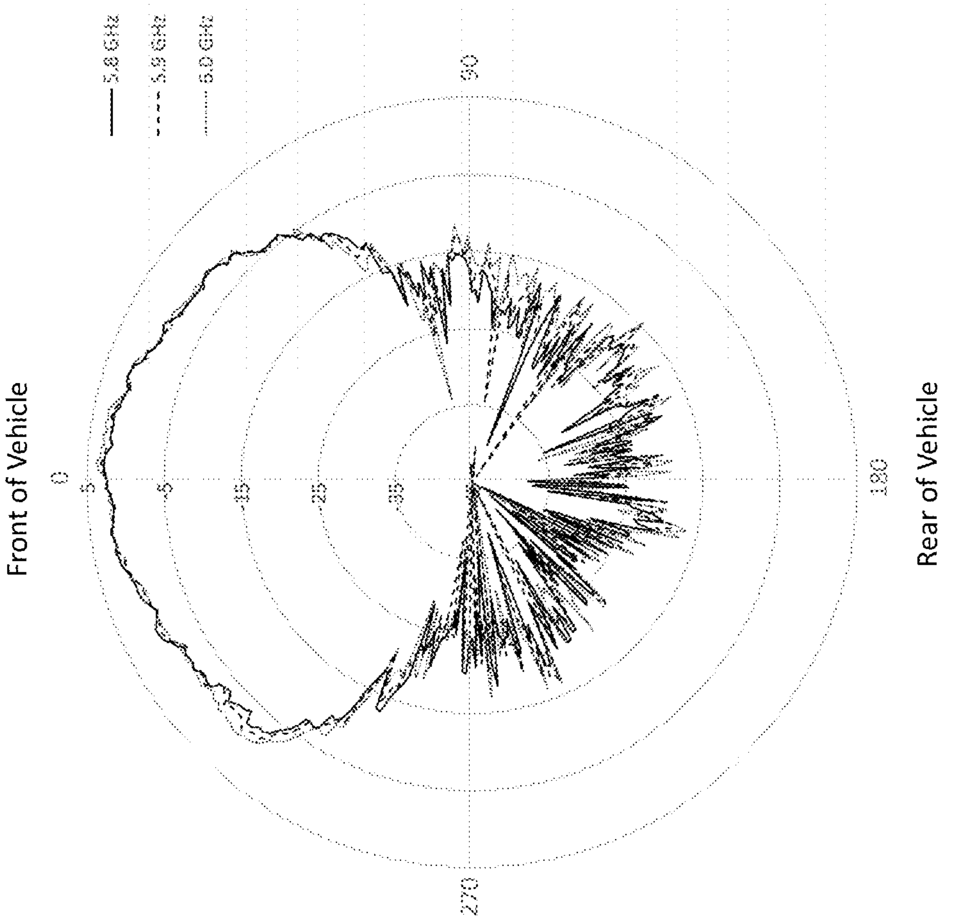
FIG. 20 is a graph illustrating vertically polarized gain pattern of the unidirectional antenna at DSRC frequencies and at 10° elevation angle.

Referring to FIG. 20, vehicle antenna radiation pattern for vertical polarization at elevation angle 10° is shown. The patch antenna maximum gain is about 3 dBi and directed to the front of the vehicle. The half power beam width in the azimuth plane is about 70°. The antenna gain and beam width also depend on the installation angle of the windshield on a vehicle. The windshield antenna provides better coverage in the forward-facing vehicle direction than in the backward or side directions. The antenna can be embedded in the windshield, the back window, and the side windows for a diversity system with omnidirectional far field radiation pattern in terrestrial direction.

Figure 21:
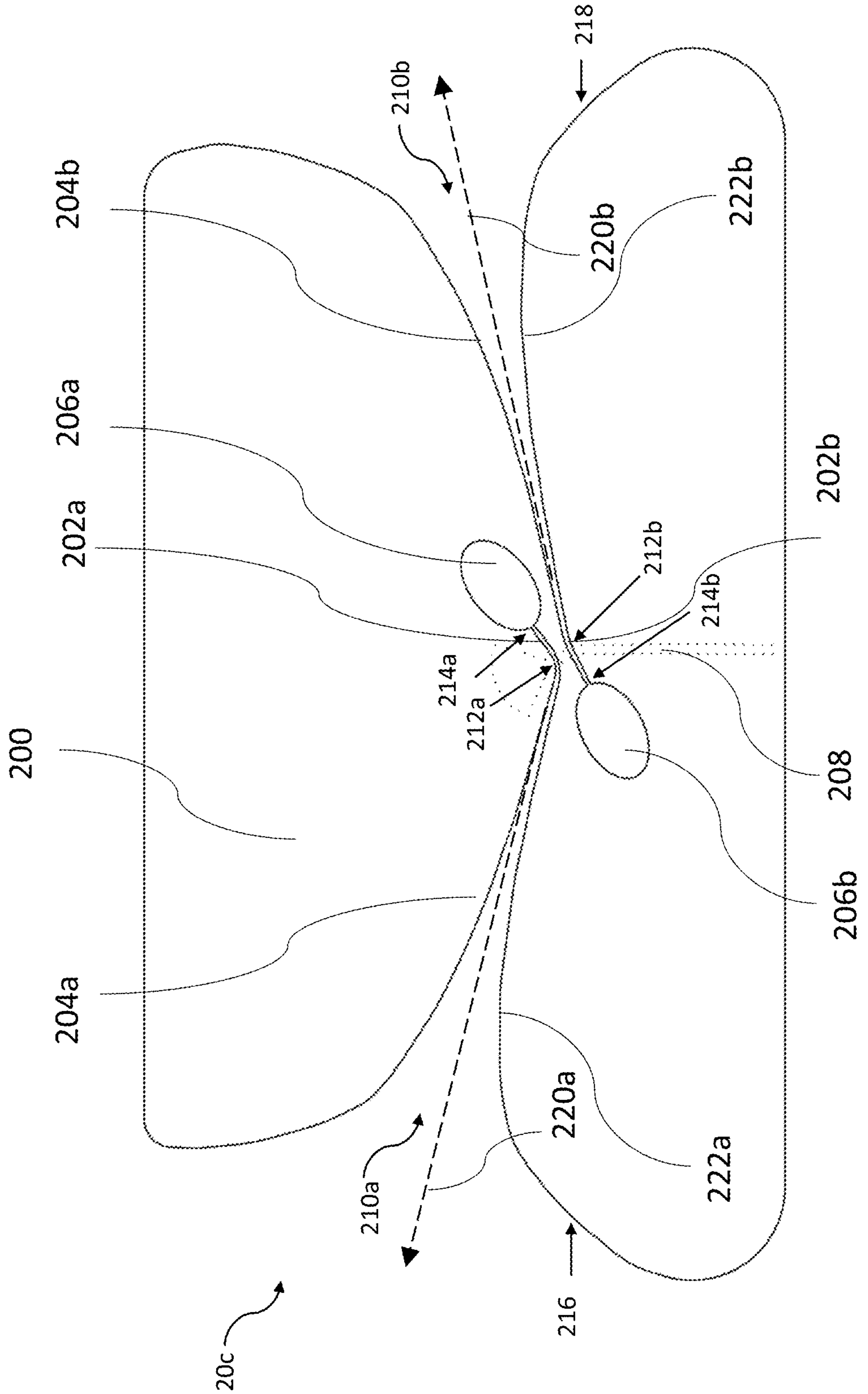
FIG. 21 is a top view of a wideband antenna having a microstrip feed line according to a non-limiting aspect of the invention.

Referring to FIGS. 3, 4, and 21, a wideband antenna 20*c* may include a dielectric substrate and a ground plane 200 disposed on one side of the surface of the substrate having a plurality of tapered slot radiators 210 according to a non-limiting aspect of the invention is shown. The wideband antenna 20*c* may be placed on the outer surface 136 of the inner transparent ply 34. A first tapered slot radiator 210*a* may include a first slot opening 202*a*, a first tapered opening 204*a*, and a first impedance matching opening 206*a* in the ground plane 200. The first slot opening 202*a* may be formed in the ground plane 200, the first slot opening 202*a* defining a first end 212*a* and a second end 214*a* opposite the first end. The first tapered opening 204*a* may be formed in the ground plane 200 beginning at the first end 212*a* of first slot opening 202*a* and ending at the first side 216 of the ground plane 200. The first tapered opening 204*a* may generally increase from the first end 212*a* of first slot opening 202*a* toward the first side 216 of the ground plane 200. The first impedance matching opening 206*a* in the ground plane 200 may be formed in an oval shape adjacent the second end 214*a* of the first slot opening 202*a*. It is appreciated that the first impedance matching opening 206*a* may be formed in other suitable shapes, such as a circle, rectangle, etc. The first impedance matching opening 206*a* may be formed to act as an open circuit to the first tapered slot radiator.

Referring to FIG. 21, a second tapered slot radiator 210*b* may include a second slot opening 202*b*, a second tapered opening 204*b*, and a second impedance matching opening 206*b* in the ground plane 200. The second slot opening 202*b* may be formed in the ground plane 200 between a first end 212*b* and a second end 214*b* opposite the first end 212*b*. The second tapered 204*b* opening may generally increase from the first end 212*b* of second slot opening 202*b* of the second slot 202*b* toward the second side 218 of the ground plane 200. The second impedance matching opening 206*b* in the ground plane 200 may be formed in an oval shape adjacent the second end 214*b* of the second slot opening 202*b*. It is appreciated that the second impedance matching opening 206*b* may be formed in other suitable shapes, such as a circle, rectangle, etc. The second impedance matching opening 206*b* may be formed to act as an open circuit to the second tapered slot radiator 210*b*. Each tapered slot radiator 210 has a directional beam 220 toward the mouth 222 of the tapered slot radiator 210. The first slot opening 202*a* and the second slot 202*b* opening may be spaced apart and positioned in parallel and adjacent to each other.

With continued reference to FIG. 21, the wideband antenna 20*c* may have two or more tapered slot radiators directing towards different sides of the ground plane 200 with multiple beams 220 that provides better coverage than an antenna with single tapered slot. The wideband antenna 20*c* may be configured to transmit and receive 5G sub 6 and 4G LTE signals. The first slot opening 202*a* and the second slot opening 202*b* may be spaced in close proximity and in parallel to each other. An antenna feed line may across the first slot opening 202*a* and the second slot opening 202*b* at 90° right angle and may feed the first and second slot radiators 210 simultaneously in-phase. The first tapered opening 202*a* may have a symmetric axis that is also the center line of the beam 220*a* of the first tapered slot radiator. The second tapered opening 202*b* has a symmetric axis that is also the center line of the beam 222*b* of the second tapered slot radiator 210*b*. The angle ϕ between axis formed by the beam 220*a* and the beam 220*b* may be adjustable depending on the signal coverage requirement of the antenna and the physical location of the antenna. The angle ϕ may be tunable between 30° and 180°. The wideband antenna 20*c* having two or more tapered slot radiators 210 directing towards different sides of the ground plane 200 with multiple beams may provide better signal coverage than an antenna with single tapered slot. The wideband antenna 20 may be configured to transmit and receive 5G sub-6 and 4G LTE cellular signals.

With continued reference to FIG. 21, the wideband antenna 20*c* may be fed by a microstrip line 208 that is etched on the bottom side of a substrate according to a non-limiting aspect of the invention. The wideband antenna 20*c* may be excited by electromagnetic coupling between the microstrip line 208 and the first slot 202*a* and the second slot 202*b*. The characteristic impedance of microstrip line 208 and the width of microstrip line 208 affect electromagnetic coupling to the first slot 202*a* and the second slot 202*b*. For maximum coupling, microstrip line 208 may be oriented to with respect to the first slot 202*a* and the second slot 202*b* such that the longitudinal dimension of microstrip line 208 is oriented at right angles to the first slot 202*a* and the second slot 202*b*. After crossing the first slot 202*a* and the second slot 202*b* microstrip line 208 may be terminated with an open circuit quarter-wavelength radial stud for wideband antenna matching.

Figure 22:
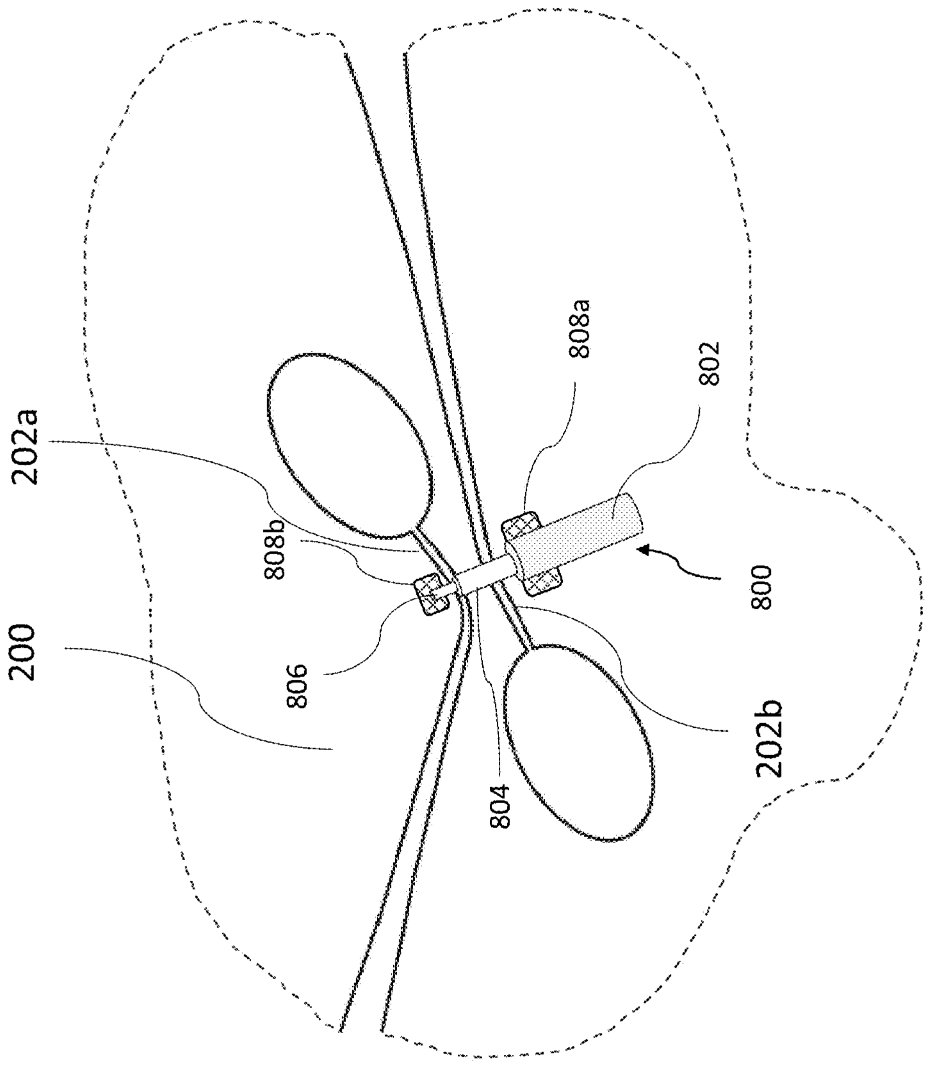
FIG. 22 is a top view of a wideband antenna having a coaxial cable feed line according to a non-limiting aspect of the invention.

Referring to FIG. 22, a wideband antenna 20*c* according to a non-limiting aspect of the invention is shown. The wideband antenna 20*c* may be fed directly through the first slot 202*a* and the second slot 202*b* using a coaxial cable 800 that has a center conductor 806 and an outer shield 802. For example, the wideband antenna 20*c* may be fed directly through a center portion of the first slot opening 202*a* and a center portion of the second slot opening 202*b* using a coaxial cable 800 that has a center conductor 806 and an outer shield 802. The center conductor 806 may extend over the first slot 202*a* and the second slot 202*b* and may be galvanically connected to the furthest side of the first slot 202*a* at a solder pad 808*b* on the ground plane 200. Outer shield 802 may be galvanically connected to the near side of the second slot 202*b* at a solder pad 808*a* on ground plane 200.

Figure 23:
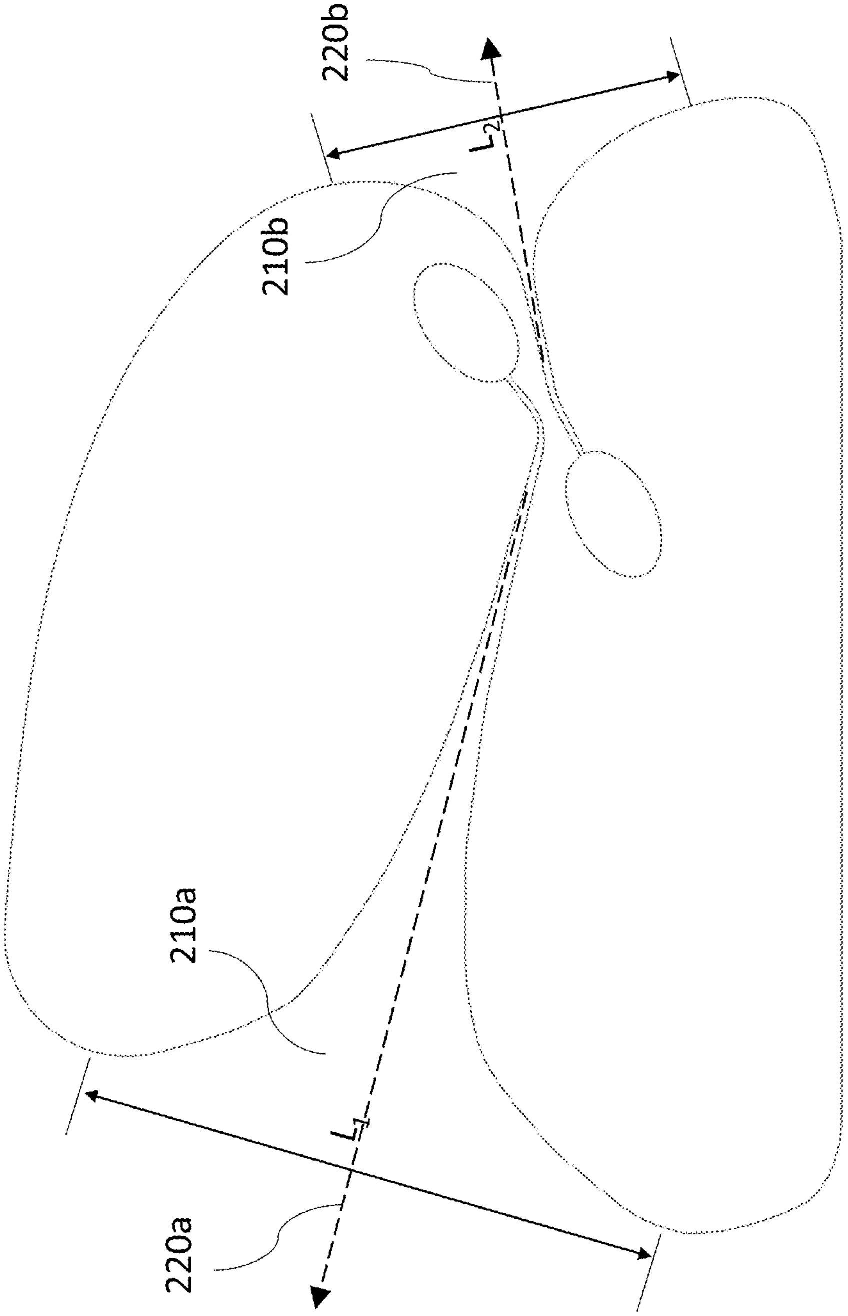
FIG. 23 is a top view of a wideband antenna according to a non-limiting aspect of the invention.

Referring to FIG. 23, a wideband antenna 20*c* according to a non-limiting aspect of the invention is shown. The wideband antenna 20*c* may have two tapered slot radiators 210*a* and 210*b* where first tapered slot radiator 210*a* may have a wider opening than the second slot radiator 210*b*. The first slot radiator 210*a* may be tuned for a lower frequency band while the second tapered slot radiator 210*b* may be tuned for a higher frequency band. For tapered slot antenna 20*c*, it is generally required that the length of the mouth should be greater or equal to half wavelength at minimum operating frequency. The wideband antenna 20*c* may have two tapered slot radiators 210*a* and 210*b* with the mouth 222*a* with a width of L1 and the mouth 222*b* with a width of L2. L1 may be greater than L2. Each slot radiator 210 can be tuned for different applications. For example, the first tapered slot radiator 210*a* may be tuned for mobile LTE antenna with lower frequency tuned to 700 MHz and the second tapered slot radiator 210*b* may be tuned to 2.4 GHz and 5G WI-FI or 5.8 GHz V2V frequency bands.

Figure 24:
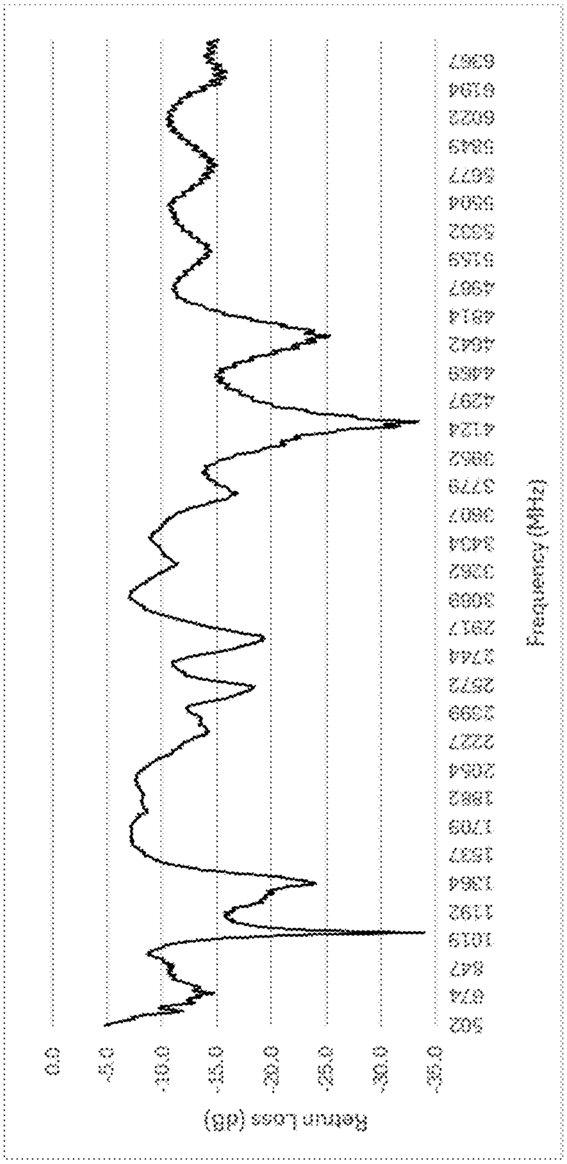
FIG. 24 is a graph illustrating the measured frequency response of a wideband antenna according to a non-limiting aspect of the invention.

Referring to FIG. 24, a frequency response of the antenna shown. For example, the frequency response of the antenna is well matched from 600 MHz to beyond 6.5 GHz. The antenna shows the wideband nature that covers the entire 4G LTE bands and 5G sub-6 bands. For this frequency response, a wideband antenna shown in FIG. 21 with coaxial feed as shown on FIG. 22 was fabricated on a windshield measured on an electric vehicle. The wideband antenna has a total length of 150 mm and width of 90 mm designed for operating at a minimum frequency of 600 MHz. The antenna is printed on the outer surface 136 of inner transparent ply 34. The thickness of inner and outer transparent ply 34 is 2.3 mm respectively with a relative dielectric constant of 7.5 and a loss tangent of tan $\delta$=0.02. The thickness of interlayer 36 is 0.8 mm with a relative dielectric constant of 3.3 and a loss tangent of tan $\delta$=0.05. The antenna 20 is positioned on the top passenger side of the windshield and behind the black paint band with two tapered slot openings face towards the opposite side of the vehicle. FIG. 26 illustrates a measured return loss (S11) performance of the antenna. Of the power delivered to the antenna, return loss S11 is a measure of how much power is reflected from the antenna and how much is "accepted" by the antenna and radiated.

Figure 25:
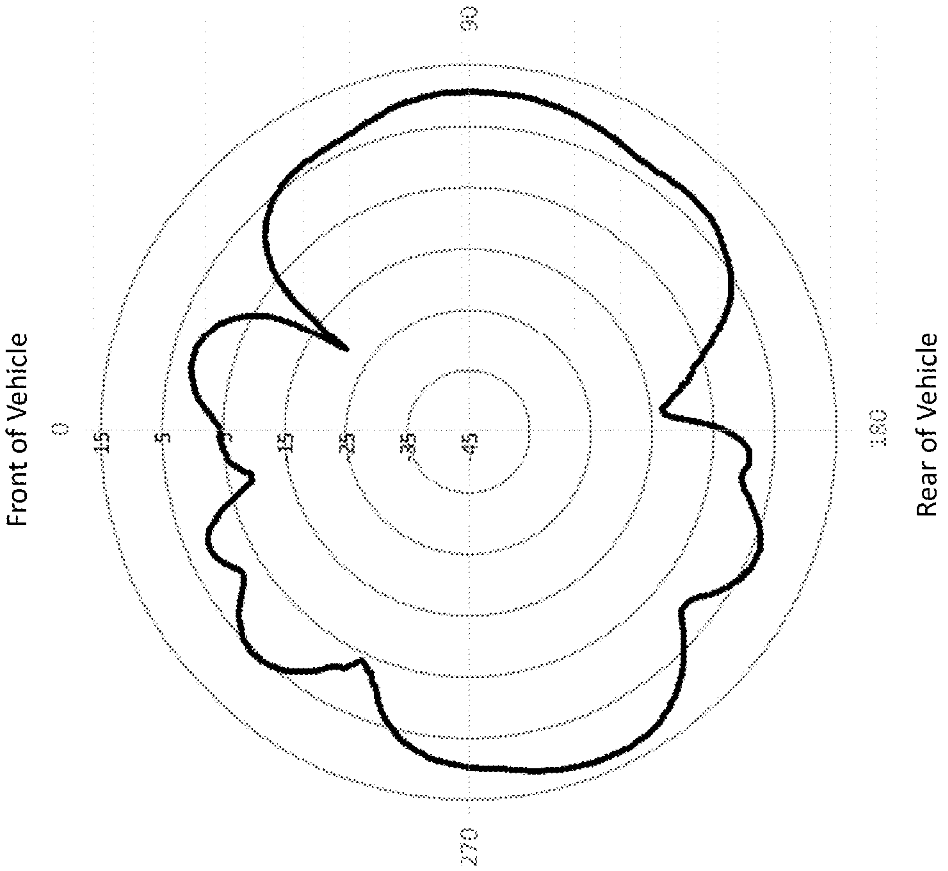
FIG. 25 is a graph illustrating the measured radiation pattern of a wideband antenna according to a non-limiting aspect of the invention.

Referring to FIG. 25, vehicle antenna radiation pattern for vertical polarization at elevation angle 0° is shown at 700 MHz. The radiation pattern has two main beams pointing toward two sides of the vehicle as expected. The maximum gain of the exemplary pattern shows approximately 10-12 dBi. The antenna radiation pattern is also dependent on the installation angle of the windshield on a vehicle. The antenna on the windshield provides better coverage in the side directions. The antenna may be printed on the side windows for better front and rear coverage to form an antenna diversity system with nearly omnidirectional far field radiation pattern in the terrestrial direction.

While the disclosed invention has been described and illustrated by reference to certain preferred embodiments and implementations, it should be understood that various modifications may be adopted without departing from the spirit of the invention or the scope of the following claims.

What is claimed is:

1. A windshield comprising:

an outer transparent ply that defines an inner surface and an outer surface oppositely disposed from the inner surface;

an inner transparent ply that defines an outer surface and an inner surface oppositely disposed from the outer surface;

an interlayer disposed between the inner surface of the outer transparent ply and the inner surface of the inner transparent ply;

a circularly polarized antenna disposed on the outer surface of the inner transparent ply;

an unidirectional antenna disposed on the inner surface of the outer transparent ply and the outer surface of the inner transparent ply; and a wideband antenna disposed on the outer surface of the inner transparent ply.

2. The windshield of claim 1, wherein the circularly polarized antenna comprises:

a ground plane having four sides, wherein an inner edge of the four sides of the ground plane defines a slot therein;

a cross-shaped antenna feeding structure, wherein the antenna feeding structure defines a first element and a second element, wherein the second element is substantially perpendicular to the first element, wherein the first element extends into the slot of the first side of the ground plane; and a tuning stub extending from a second side of the ground plane, wherein the tuning stub extends substantially perpendicular to the second side and towards the antenna feeding structure.

3. The windshield of claim 2, wherein the slot and the antenna feeding structure extending into the slot form a co-planar waveguide, wherein the slot is a tapered slot, and wherein the slot is widened conically towards the inner edge of the first side of the ground plane, and wherein the slot is configured to improve antenna impedance matching.

4. The windshield of claim 3, wherein the circularly polarized antenna comprises a coaxial cable, the coaxial cable comprising an outer shield and a center conductor, wherein the co-axial cable is connected to the co-planar waveguide, wherein a portion of the outer shield is in contact with the first side of the ground plane, and wherein the center conductor is connected to the first element of the antenna feeding structure.

5. The windshield of claim 2, wherein the first element of the antenna feed structure is configured to energize the circularly polarized antenna at a first mode, wherein the tuning stub is configured to excite the circularly polarized antenna to resonate at a second mode, wherein the first and the second mode are orthogonal modes having identical amplitude and in phase quadrature.

6. The windshield of claim 2, wherein the circularly polarized antenna is configured to receive and transmit right-hand circularly polarized signals, wherein the right-hand circularly polarized signals are GNSS signals, and wherein the circularly polarized antenna has wide bandwidth and covers GNSS L1, L2, L3, L4, and L5 bands from 1000 MHz to 1850 MHz.

7. The windshield of claim 1, wherein the unidirectional antenna comprises:

a first conductive layer disposed between the inner surface of the outer transparent ply and the inner transparent ply, wherein the first conductive layer comprises a plurality of patches, wherein the plurality of patches comprise a first patch, a second patch, and a third patch, wherein the first conductive layer defines an outer perimeter, and wherein the plurality of patches are spaced apart and positioned in parallel and adjacent to each other;

a second conductive layer disposed on the outer surface of the inner transparent ply, wherein the second conductive layer comprises a plurality of slots, wherein the second conductive layer defines an outer perimeter and the plurality of slots comprise a first slot and a second slot, wherein the second slot's length is greater than the first slot's length, wherein the second conductive layer is laterally aligned with respect to the first conductive layer such that the outer perimeter of the first conductive layer aligns inside the outer perimeter of the second conductive layer and the first slot aligns with an outer perimeter of the first patch, wherein the first slot of the second conducive layer is spaced apart from the plurality of patches of the first conductive layer such that electrical signals applied to the perimeter of the first slot are electromagnetically coupled to the plurality of patches of the first conductive layer; and a transmission line that electrically connects to the first slot at a feed position at a center of the first slot.

8. The windshield of claim 7, wherein the second conducive layer is the electrical ground element of the unidirectional antenna, and wherein the first slot defines a first longitudinal side and a second longitudinal, and wherein the first slot is a driving slot.

9. The windshield of claim 8, wherein maximum electromagnetic field in the first slot occurs in the center of the first slot and wherein the maximum electrical field of the first patch occurs in a center edge of the first patch, wherein energy is electromagnetically coupled between the first slot and the first patch, and wherein the first patch is a first director of the unidirectional antenna.

10. The windshield of claim 7, wherein the second slot is longer than the first slot and spaced from the first slot on the first longitudinal side of the first slot such that transmitted signals from the driving slot reflected by the second slot have a phase difference of x when the signals radiated from the driving slot meet at the feed position.

11. The windshield of claim 7, wherein the outer perimeter of the first patch is laterally aligned with respect to the first longitudinal side of the first slot and overlaps the second longitudinal side of the first slot, wherein the first patch is positioned on a second longitudinal side of the first slot.

12. The windshield of claim 7, wherein the second patch and the third patch are in parallel and in adjacent equally spaced to the first patch on the second longitudinal side of the first slot, wherein the second patch is a second director of the unidirectional antenna and wherein the third patch is a third director of the unidirectional antenna, and wherein the first, second, and third directors are electromagnetically coupled to each other to pull the antenna radiation pattern towards the third director direction.

13. The windshield of claim 7, wherein the transmission line is a coaxial cable having a center conductor surrounded by an outer shield, wherein the outer shield is connected to the second longitudinal side of the first slot, and wherein the center conductor is connected to the first longitudinal side of the first slot, and wherein the coaxial cable and the first slot transmit and receive electromagnetic energy to and from the second slot of the second conductive layer and first, second, and third patches of the first conductive layer.

14. The windshield of claim 13, wherein the second slot reflects signals from the first slot and combine with first, second, and third patches of the first conductive layer to have the unidirectional antenna achieve unidirectional radiation, and wherein a bandwidth of the unidirectional antenna covers WI-FI under IEEE 802.11a/ac standard from 5.18 GHz to 5.85 GHz and the DSRC band of 5.85 to 5.925 GHz.

15. The windshield of claim 7, wherein lengths of the first slot and the first patch determine a resonant frequency of the unidirectional antenna, and wherein widths of the first slot and the first patch affect the resonant resistance of the unidirectional antenna.

16. The windshield of claim 7, wherein the transmission line is a microstrip line that is etched on a substrate attached to the outer surface of the inner transparent ply, wherein the unidirectional antenna is excited though two coupling stages, wherein one coupling stage is between the microstrip line and the first slot of the second conductive layer, and wherein one coupling stage is between the first slot and the second slot of the second conductive layer and the first, second, and third patches of the first conductive layer, and, wherein the microstrip line is oriented at right angles to the centerline of the first slot and turned at a right angle between the first and second slot such that the microstrip line only crosses the first slot.

17. The windshield of claim 1, wherein the wideband antenna comprises:

a dielectric substrate;

a conductive sheet on the dielectric substrate;

a first tapered slot radiator comprising:

a first slot opening having a first end and a second end formed in the conductive sheet;

a first tapered opening formed in the conductive sheet, wherein the first tapered opening is formed between the first end of first slot opening and the first side of the conductive sheet, wherein the first tapered opening gradually increases from the first end of first slot opening towards the first side of the conductive sheet; and a first impedance matching opening in the conductive sheet formed in the shape of an ovel adjacent the second end of the first slot opening;

a second tapered slot radiator comprising:

a second slot opening having a first end and a second end formed in the conductive sheet;

a second tapered opening formed in the conductive sheet, wherein the second tapered opening is formed between the first end of second slot opening and the second side of the conductive sheet, wherein the second tapered opening gradually increases from the first end of second slot opening towards second side of the conductive sheet; and a second impedance matching opening in the conductive sheet formed in the shape of an ovel adjacent the second end of the second slot opening; and a transmission line that electrically connected to the first and second slot openings.

18. The windshield of claim 17, wherein the first slot opening and the second slot opening are spaced apart and positioned in parallel and adjacent to each other, wherein a center portion of the first slot opening and the second slot opening of the wideband antenna defines the antenna feed point, and, wherein the transmission line across first slot opening and second slot opening is configured to simultaneously excite the first tapered slot radiator and the second tapered slot radiator.

19. The windshield of claim 17, wherein the first tapered slot radiator has a radiation beam towards the first side of the conductive sheet and the second tapered slot radiator has a radiation beam towards the second side of the conductive sheet.

20. The windshield of claim 17, wherein the size of the mouth of the first tapered slot radiator is bigger than the size of the mouth of the second tapered slot radiator, wherein the first tapered slot radiator is tuned for a lower frequency band and the second tapered slot radiator is tuned for a higher frequency band, and, wherein the wideband antenna is configured to transmit and receive 4G LTE and 5G sub-6 signals.

* * * * *